US012776343B2

(12) United States Patent
Szita et al.

(10) Patent No.: US 12,776,343 B2
(45) Date of Patent: Oct. 27, 2026

(54) LASER CURRENT CALIBRATION UNDER ID CRASH STOP COMPRESSION AREA FOR BLANK DISK SELF-SERVO WRITE

(71) Applicants: Kabushiki Kaisha Toshiba, Tokyo (JP); Toshiba Electronic Devices & Storage Corporation, Tokyo (JP)

(72) Inventors: Gabor Szita, Newark, CA (US); Hengchang Guo, Rancho Santa Margarita, CA (US); Jiangang Liang, Saratoga, CA (US); Gary W. Calfee, Santa Clara, CA (US)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/217,815

(22) Filed: May 23, 2025

(65) Prior Publication Data

US 2026/0268932 A1 Sep. 10, 2026

Related U.S. Application Data

(60) Provisional application No. 63/768,108, filed on Mar. 6, 2025.

(51) Int. Cl.

*G11B 5/596* (2006.01)
*G11B 5/55* (2006.01)
*G11B 5/00* (2006.01)

(52) U.S. Cl.

CPC .. *G11B 5/59666* (2013.01); *G11B 2005/0021* (2013.01)

(58) Field of Classification Search

CPC .................. G11B 5/012; G11B 5/4555; G11B 2005/0021; G11B 5/03; G11B 20/182; G11B 5/02; G11B 5/40; G11B 20/10351; G11B 5/3912; G11B 5/39; G11B 5/6082; G11B 5/3133; G11B 5/314; G11B 5/1278; G11B 5/3116; G11B 5/3163; G11B 7/124; G11B 7/1387; G11B 7/1267; G11B 5/59627; G11B 5/5547; G11B 5/59623; G11B 5/59688

USPC .......................................................... 360/59

See application file for complete search history.

(56) References Cited

U.S. PATENT DOCUMENTS

| | | | | |
|---|---|---|---|---|
| 6,418,102 | B1 * | 7/2002 | Suga | G11B 7/126 |
| 8,897,103 | B2 | 11/2014 | Alex | |
| 9,099,144 | B1 | 8/2015 | Chia et al. | |
| 9,892,752 | B1 * | 2/2018 | Chu | G11B 5/5534 |
| 10,127,930 | B1 | 11/2018 | Chu et al. | |
| 10,395,673 | B1 | 8/2019 | Chu et al. | |

(Continued)

*Primary Examiner* — Nabil Z Hindi
(74) *Attorney, Agent, or Firm* — Kim & Stewart LLP

(57) ABSTRACT

An in-drive calibration scheme is described for selecting a laser operating current for each write head of a hard disk drive that employs heat-assisted magnetic recording (HAMR). A magnetic head is positioned above a target write region of a magnetic disk, for example, at an inner diameter region. A test servo pattern is then written in the target write region with the magnetic head while the target write region is irradiated by a laser in the magnetic head and the laser operates at a selected laser operating current value. If the test servo pattern fails to meet a quality threshold, the selected laser operating current value is increased, and another servo pattern is written in the target write region.

20 Claims, 16 Drawing Sheets

(56) References Cited

U.S. PATENT DOCUMENTS

| | | | |
|---|---|---|---|
| 10,832,704 | B2 | 11/2020 | Mader |
| 11,270,733 | B2 | 3/2022 | Gilbert et al. |

* cited by examiner

LASER CURRENT CALIBRATION UNDER ID CRASH STOP COMPRESSION AREA FOR BLANK DISK SELF-SERVO WRITE

CROSS-REFERENCE TO RELATED APPLICATION(S)

This application claims the benefit of U.S. Provisional Application No. 63/768,108, filed Mar. 6, 2025, the entire contents of which are incorporated herein by reference.

BACKGROUND

Heat-assisted magnetic recording (HAMR) is a developing technology that can significantly increase the areal density, and therefore the total data storage capacity, of the disks of a hard disk drive. HAMR involves temporarily heating the disk material during writing, which enables writing data in a smaller area on the disk. Generally, a laser included in each write head is used in HAMR to heat a tiny spot on the disk during the data-writing process.

One issue with HAMR is that, for reliable performance of a hard disk drive, there is a narrow range of acceptable laser current that can be employed for the laser in each write head. Specifically, applying too little laser current during writing results in insufficient signal quality, while applying too much laser current during writing can reduce the lifetime of the laser diode, as well as generate unwanted contamination on the disk surface. Further, significant head-to-head variation has been shown in the performance of lasers typically included in hard disk drive write heads, where the same applied laser current can result in different laser output when applied to different lasers. Consequently, when a single default laser current is applied to each of the nominally identical lasers included in a hard disk drive, some of these lasers receive insufficient laser current to write data with the necessary signal quality while other lasers receive too much laser current and are subject to early failure.

In light of the above, there is a need in the art for accurately calibrating laser performance in hard disk drives that employ HAMR.

SUMMARY

One or more embodiments provide systems and methods for an in-drive calibration scheme to select a laser operating current for each write head of a hard disk drive that employs HAMR. In the embodiments, a laser operating current for each write head is determined after the write heads and magnetic media are assembled and before servo spiral patterns and final product servo patterns are written onto the magnetic media in a self-servo write process. Specifically, a magnetic head is positioned above a target write region of a magnetic disk, for example, at an inner diameter region. A test servo pattern is then written in the target write region with the magnetic head while the target write region is irradiated by a laser in the magnetic head and the laser operates at a selected laser operating current value. If the test servo pattern fails to meet a quality threshold, the selected laser operating current value is increased, and another servo pattern is written in the target write region. This process continues for the magnetic head until a test servo pattern meets the quality threshold, indicating the laser operating current value to be employed in subsequent operation of the hard disk drive.

In some embodiments, the test servo pattern is implemented as a short servo spiral written in an inner diameter region that corresponds to the position of a magnetic head where an inner diameter stopper is compressed by the voice-coil motor of the hard disk drive (a so-called "ID crash-stop compression area"). In other embodiments, the test servo pattern is implemented as a sinusoidal or other periodic or oscillatory pattern within the ID crash stop compression area, where the sinusoidal or oscillatory pattern crosses an evaluation path multiple times. In such embodiments, the evaluation path can be erased prior to the writing of each iteration of the sinusoidal or oscillatory pattern.

At least one advantage of some of the herein-described embodiments is that a process using in-drive calibrated laser operating current can compensate for the wide head-to-head variation that exists in laser performance in conventional HAMR hard disk drives. At least one advantage of some of the herein-described embodiments is that the herein-described calibration process can be rerun an arbitrary number of times on the same disk surface.

A disk drive, according to an embodiment, includes: a magnetic head that includes a laser; a rotating magnetic recording medium associated with the magnetic head; and a controller. The controller is configured to perform the steps of: moving the magnetic head above a target write region at an inner diameter region of the rotating magnetic recording medium; selecting a current value for the laser; writing a test servo pattern on the target write region using the magnetic head while irradiating the target write region with the laser operating at the selected current value; determining that the test servo pattern meets a quality threshold; and outputting the selected current value to be the current value to be used by the laser during heat-assisted magnetic recording of one or more servo patterns on the rotating magnetic recording medium.

According to an embodiment, a computer-implemented method of setting an operating current of a laser that is used in heat-assisted magnetic recording includes: moving a magnetic head above a target write region at an inner diameter region of a rotating magnetic recording medium; selecting a current value for the laser; writing a test servo pattern on the target write region using the magnetic head while irradiating the target write region with the laser operating at the selected current value; determining that the test servo pattern meets a quality threshold; and outputting the selected current value to be the current value to be used by the laser during heat-assisted magnetic recording of one or more servo patterns on the rotating magnetic recording medium.

BRIEF DESCRIPTION OF THE DRAWINGS

For clarity, identical reference numbers have been used, where applicable, to designate identical elements that are common between figures. It is contemplated that features of one embodiment may be incorporated in other embodiments without further recitation.

DETAILED DESCRIPTION

System Overview

Figure 1:
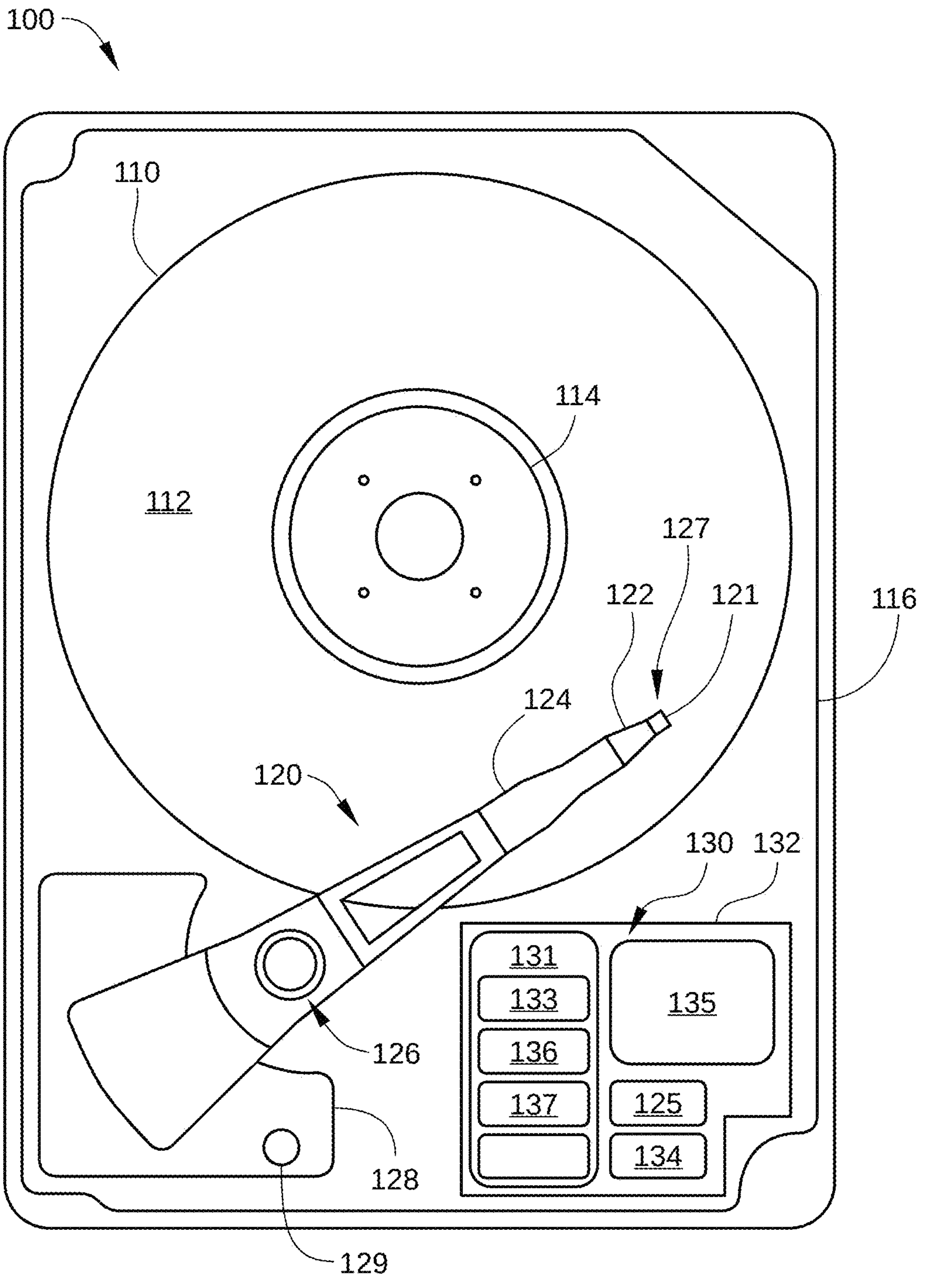
FIG. 1 is a schematic view of an exemplary hard disk drive, according to one embodiment.

FIG. 1 is a schematic view of an exemplary hard disk drive (HDD) 100, according to one embodiment. For clarity, HDD 100 is illustrated without a top cover. HDD 100 includes multiple storage disks 110 (only one of which is visible in FIG. 1) that each include one or two recording surfaces 112 on which a plurality of concentric data storage tracks are disposed. Each storage disk 110 is a rotating magnetic recording medium and is coupled to and rotated by a spindle motor 114 that is mounted on a base plate 116. An actuator arm assembly 120 is also mounted on base plate 116, and includes one or more sliders 121 (only one of which is visible in FIG. 1), each mounted on a flexure arm 122 with a magnetic read/write head 127 that reads data from and writes data to the data storage tracks of an associated recording surface 112. Each flexure arm 122 is attached to an actuator arm 124 that rotates about a bearing assembly 126 by a voice coil motor 128. Thus, voice coil motor 128 moves all of the one or more sliders 121 radially relative to a respective recording surface 112 of a respective storage disk 110, thereby positioning a read/write head 127 over a desired concentric data storage track. A crash stop 129 limits movement of read/write head 127 into an inner periphery of storage disk 110 by preventing rotation of VCM 128 and/or actuator arm assembly 120 about bearing assembly 126 beyond a specified angle.

Each read/write head 127 is a magnetic head that includes a read head and a write head (not shown). The read head of each read/write head 127 is configured to generate an output signal when moving past data or servo information written to the surface of the storage disk 110 that is associated with that read/write head 127. The write head of each read/write head 127 is configured to write information to the surface of the storage disk 110 that is associated with that read/write head 127.

To achieve higher areal density in HDD 100, each read/write head 127 of HDD 100 is configured as a heat-assisted magnetic recording (HAMR) head. Thus, in some embodiments, each read/write head 127 includes a laser for heating a microscopic area of the associated storage disk 110 when writing information onto the storage disk 110. One embodiment of read/write head 127 is described below in conjunction with FIG. 2.

Figure 2:
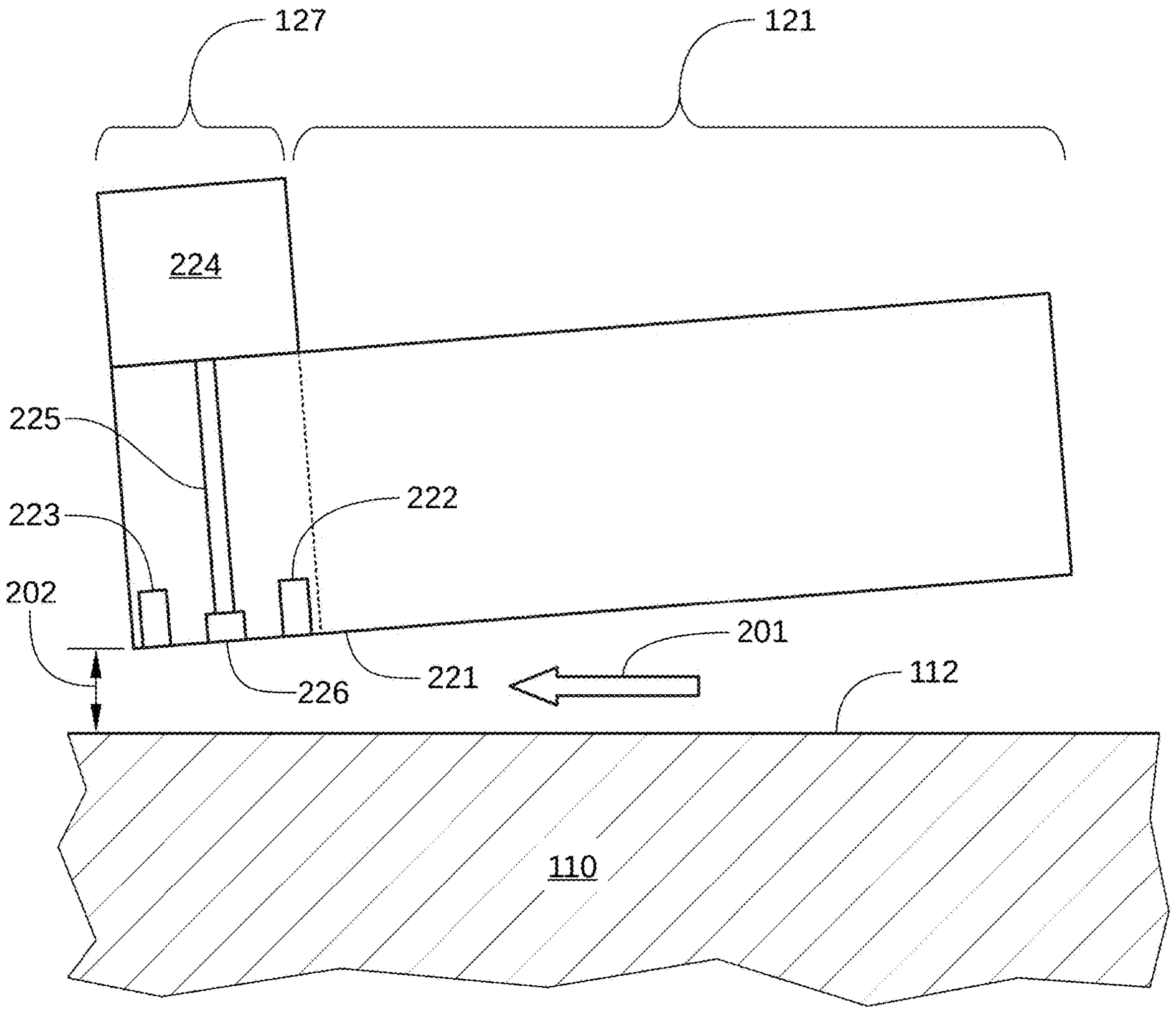
FIG. 2 schematically illustrates a read/write head, according to various embodiments.

FIG. 2 schematically illustrates read/write head 127, according to various embodiments. FIG. 2 shows read/write head 127 positioned at an end of slider 121 and suspended proximate recording surface 112 of recording disk 110, which is spinning in rotational direction 201. As read/write head 127 "flies" over recording surface 112, an air-bearing surface (ABS) 221 is lifted via the pressure generated by rotation of recording disk 110. In operation, slider 121 is configured to maintain a substantially uniform fly height 202 of read/write head 127 from recording surface 112 based on various factors, such as the mass of slider 121 and read/write head 127, the current "flying velocity" of read/write head 127 relative to recording surface 112, skew angle of the actuator arm assembly 120 (shown in FIG. 1) relative to recording disk 110, and the like. Typically, fly height 202 is targeted to be on the order of a few nanometers, which can be controlled in part via a dynamic fly-height (DFH) heater (not shown) disposed within or coupled to slider 121.

In the embodiment illustrated in FIG. 2, read/write head 127 includes a read element 222, a write element 223, a laser light source 224, a waveguide 225, and a near-field transducer (NFT) 226. Laser light source 224 can be a semiconductor laser or laser diode that is mounted on or attached to slider 121 and generates laser light for heating a spot on recording surface 112 proximate write element 223. Waveguide 225 guides laser light from laser light source 224 to NFT 226, which is positioned near write element 223. In some embodiments, NFT 226 is configured to convert optical energy received from waveguide 225 to heat energy within recording surface 112.

Returning to FIG. 1, spindle motor 114, read/write head 127, and voice coil motor 128 are coupled to electronic circuits 130, which are mounted on a printed circuit board 132. In some embodiments, each read/write head 127 has an associated additional actuator. The additional actuator (not shown) can be on the suspension (i.e., flexure arm 122), at the gimbal between the suspension and slider 121, or on slider 121, and can move the associated read/write head 127 radially a small distance. Such actuators are generally referred to as dual-stage actuators, and enable the servo system of HDD 100 to attain more accurate tracking control.

In the embodiment illustrated in FIG. 1, a single actuator arm assembly 120 is shown that includes only one slider 121, one flexure arm 122, one actuator arm 124, and one read/write head 127. In other embodiments, actuator arm assembly 120 includes a plurality of actuator arms 124, sliders 121, flexure arms 122, and read/write heads 127, where each read/write head 127 is associated with a different recording surface 112 of HDD 100. Further, in some embodiments, HDD 100 can include multiple actuator arm assemblies 120 that are each rotated about bearing assembly 126 by a respective VCM 128 independently from each other. In such embodiments, each actuator arm assembly 120 may each include a plurality of actuator arms 123, sliders 121, flexure arms 122, and read/write heads 127.

Electronic circuits 130 include a read/write channel 137, a microprocessor-based controller 133, random-access memory (RAM) 134 (which may be a dynamic RAM and used as one or more data buffers), a flash memory device 135, and, in some embodiments, a flash manager device 136. In some embodiments, read/write channel 137, microprocessor-based controller 133, and/or flash manager device 136 are included in a single chip, such as a system-on-chip 131. In some embodiments, HDD 100 further includes a motor-driver chip 125 that accepts commands from microprocessor-based controller 133 and drives both spindle motor 114 and voice coil motor 128. Read/write channel 137 communicates with the read element of read/write head 127 via a preamplifier (not shown) that may be mounted on a flex-cable that is itself mounted on either base plate 116, actuator arm 120, or both.

When data are transferred to or from a particular storage disk 110 of HDD 100, actuator arm assembly 120 moves in an arc between the inner diameter (ID) and the outer diameter (OD) of a particular storage disk 110. Actuator arm assembly 120 accelerates in one angular direction when current is passed in one direction through the voice coil of voice coil motor 128 and accelerates in an opposite direction when such current is reversed, thereby allowing control of the position of actuator arm assembly 120 and the attached read/write head 127 with respect to the particular storage disk 110. Voice coil motor 128 is coupled with a servo system that uses the positioning data read from servo patterns on storage disk 110 by read/write head 127 to determine the position of read/write head 127 over a specific data storage track. For example, the servo system may position read/write head 127 over recording surface 112 based on positioning data read from recording surface 112.

In positioning a read/write head 127 over a recording surface 112, the servo system determines an appropriate current to drive through the voice coil of voice coil motor 128, and drives said current using a current driver and associated circuitry. Typically, the appropriate current is determined based in part on a position feedback signal of the read/write head 127, such as a position error signal (PES). The PES is typically generated by using servo patterns included in servo wedges on recording surface 112 as a reference. One embodiment of recording surface 112 and associated servo patterns is illustrated in FIG. 3.

Figure 3:
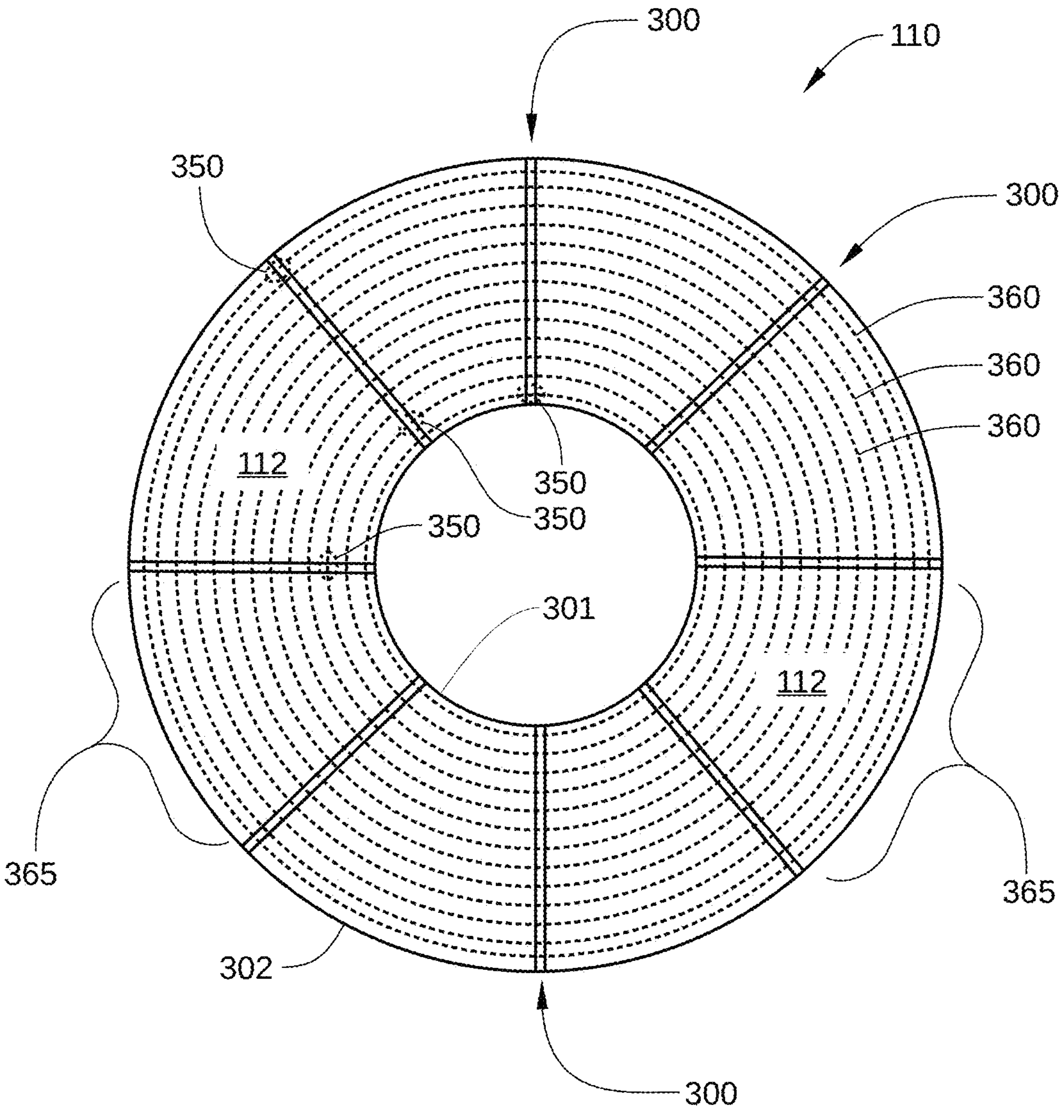
FIG. 3 schematically illustrates a recording surface of a storage disk with servo wedges and concentric data storage tracks formed thereon, according to an embodiment.

FIG. 3 schematically illustrates a recording surface 112 of a storage disk 110 with servo wedges 300 and concentric data storage tracks 360 formed thereon, according to an embodiment. Each servo wedge 300 includes a plurality of servo sectors 350 containing servo patterns and/or other servo information that defines the radial position and track pitch, i.e., spacing, of data storage tracks 360. Servo wedges 300 are written on recording surface 112 via a self-servo-write (SSW) process (described below) in which the servo system of HDD 100 positions a read/write head 127 based on servo spirals previously written on recording surface 112 and writes final product servo patterns on recording surface 112 for each data storage track 360. Servo wedges 300 for each data storage track 360 may be substantially radially aligned, as shown. In practice, servo wedges 300 may also be somewhat curved. For example, servo wedges 300 may be configured to mirror the path that would be followed by read/write head 127 if read/write head 127 were to be moved across the stroke of actuator arm assembly 120 while storage disk 110 is not spinning. Such a curved pattern advantageously results in the wedge-to-wedge timing being independent of the radial position of read/write head 127. For simplicity, servo wedges 300 are depicted as substantially straight lines in FIG. 3.

Data storage tracks 360 are formed on recording surface 112 between an ID 301 and an OD 302 of storage disk 110. Data storage tracks 360 for storing data are located in data sectors 365 as shown, and the radial position of each data storage track 360 is defined by the servo information written in servo sectors 350 for that data storage track 360. More specifically, each servo sector 350 for a particular data storage track 360 contains servo information that is read by read/write head 127 during read and write operations to position read/write head 127 above that particular data storage track 360. Typically, the actual number of data storage tracks 360 and servo wedges 300 included on recording surface 112 is considerably larger than illustrated in FIG. 3. For example, recording surface 112 may include hundreds of thousands of concentric data storage tracks 360 and hundreds of radially aligned servo wedges 300.

For HDD 100 to perform an SSW process that writes the above-described servo wedges 300 on storage disk 110 with the necessary precision for proper operation of HDD 100, position and timing information are provided to the servo system of HDD 100. The position and timing information that enable the internal servo system of HDD 100 to perform the SSW process is typically in the form of reference spiral tracks or "servo spirals" written on storage disk 110. One embodiment of such servo spirals is illustrated in FIG. 4.

Figure 4:
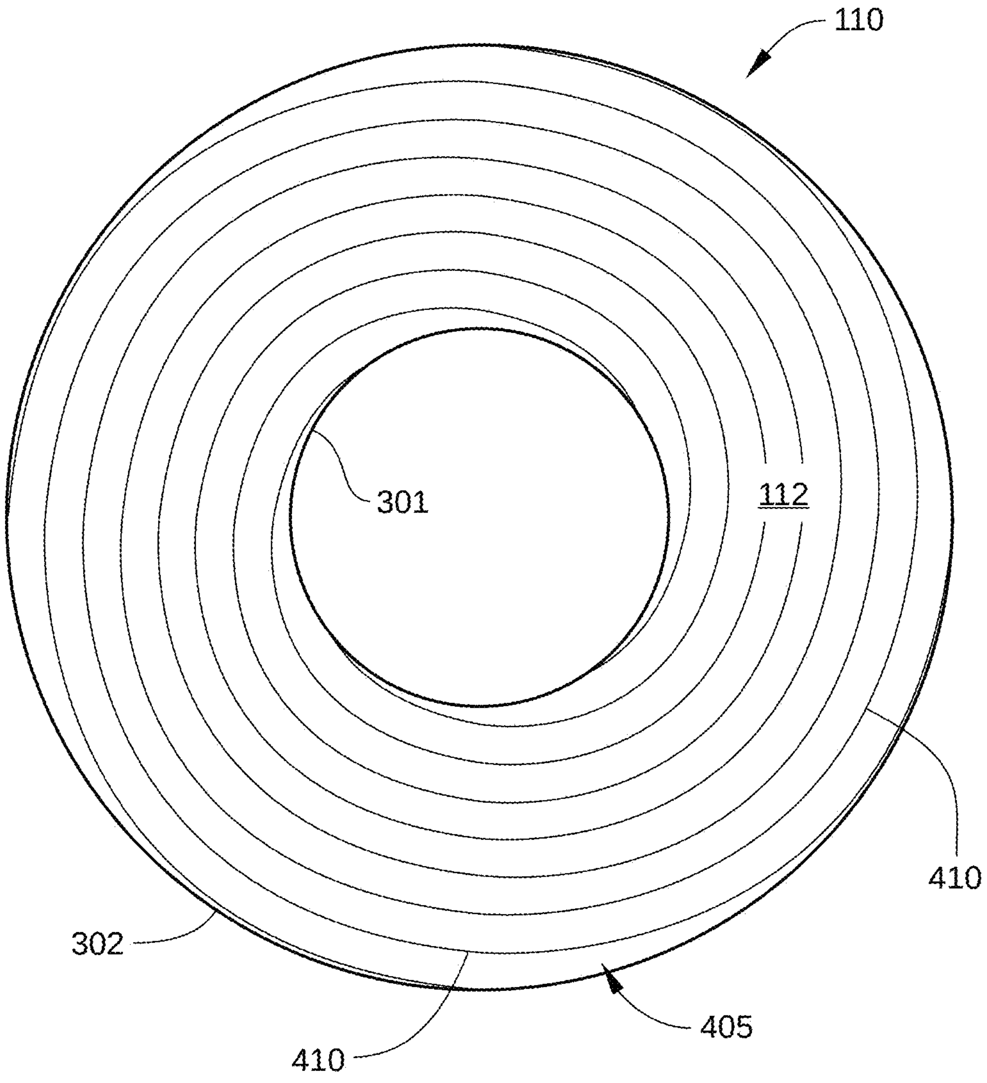
FIG. 4 schematically illustrates a recording surface of a storage disk prior to undergoing a self-servo-write process, according to an embodiment.

FIG. 4 schematically illustrates recording surface 112 storage disk 110 prior to undergoing an SSW process, according to one embodiment. As shown, storage disk 110 has a spiral set 405 written thereon that includes a plurality of servo spirals 410 that are each circumferentially spaced from adjacent servo spirals 410. It is noted that the number of servo spirals 410 in spiral set 405 is generally larger than that shown in FIG. 4, for example as few as ten or twenty, or as many as several hundred.

Spiral set 405 may be any set of servo spirals configured to provide timing and position information for the servo system of HDD 100 to position a write head while writing the final product servo patterns for each data storage track of HDD 100, such as servo wedges 300 shown in FIG. 3. In some embodiments, spiral set 405 may be written onto a substantially blank recording surface 112 of storage disk 110 without the aid of external equipment using read/write head 127 and the servo system of HDD 100. In such embodiments, spiral set 405 is written onto recording surface 112 after recording surface 112 has another set of coarse servo spirals has been written thereon (not shown for clarity), for example, via a bootstrap spiral-writing process. In such embodiments, servo spirals 410 are typically written onto recording surface 112 using closed-loop tracking of the previously written coarse servo spirals to determine the radial location of read/write head 127, and are used for the writing of servo sector information on recording surface 112 by HDD 100 in an SSW process.

Inner Diameter Test Region for Test Servo Pattern

According to various embodiments, to ensure acceptable signal quality and to avoid laser degradation during the HAMR process, laser current for each read/write head 127 of HDD 100 is calibrated before self servo write. As noted previously, applying too little laser current during HAMR leads to insufficient signal quality, while applying too much laser current during HAMR reduces the lifetime of the laser diode. In the embodiments, a test servo pattern is written in a target write region of recording surface 112 using a HAMR process, and the test servo patterns is measured against one or more quality metrics. If the test servo pattern fails to meet a quality threshold, the selected laser operating current value is increased, and another servo pattern is written in the target write region. This process continues for the magnetic head until a test servo pattern meets the quality threshold, indicating the laser operating current value to be employed in subsequent operation of the hard disk drive. According to various embodiments, the target write region is disposed within an inner diameter region of recording surface 112. One embodiment of such an inner diameter region is described below in conjunction with FIG. 5.

Figure 5:
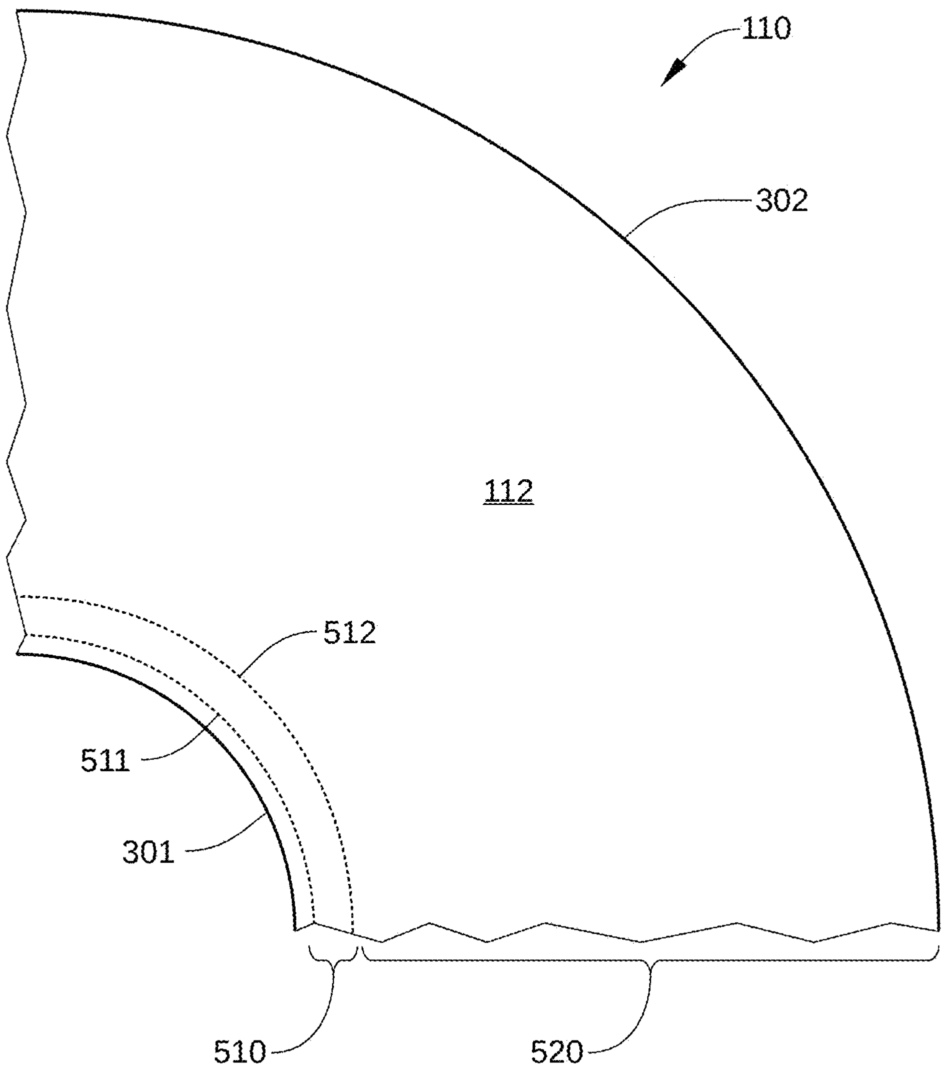
FIG. 5 schematically illustrates an inner diameter region of a recording surface, according to various embodiments.

FIG. 5 schematically illustrates an inner diameter region 510 of recording surface 112, according to various embodiments. As shown, an inner diameter region 510 is disposed proximate ID 301 of storage disk 110 and includes an inner-diameter border 511 and a user region border 512. Inner-diameter border 511 is located on an edge of inner diameter region 510 that is proximate ID 301, and user region border 512 is located on an edge of inner diameter region 510 that corresponds to an edge of a user region 520 of storage disk 110. User region 520 includes the portion of recording surface 112 that is accessed during normal operation of HDD 100. Thus, servo wedges 300, servo sectors 350, and concentric data storage tracks 360 are disposed within user region 520.

According to various embodiments, inner diameter region 510 is disposed within an ID crash-stop compression area that is outside of user region 520 of storage disk 110. In the embodiments, inner diameter region 510 corresponds to radial positions of read/write head 127 when an inner diameter stopper, such as crash stop 129, is compressed by a voice coil housing of VCM 128 of HDD 100 (read/write head 127, crash stop 129, and VCM 128 are shown in FIG. 1). That is, when a voice coil housing of VCM 128 is commanded to move against and elastically compress a surface of crash stop 129, read/write head 127 is displaced radially outside of user region 520 and into inner diameter region 510. Generally, inner diameter region 510 is a relatively narrow annular strip that spans a radial distance equivalent to no more than the radial distance spanned by a few thousand data storage tracks. The compression of crash stop 129 that enables positioning of read/write head 127 within inner diameter region 510 is described below in conjunction with FIGS. 6A and 6B.

Figure 6A:
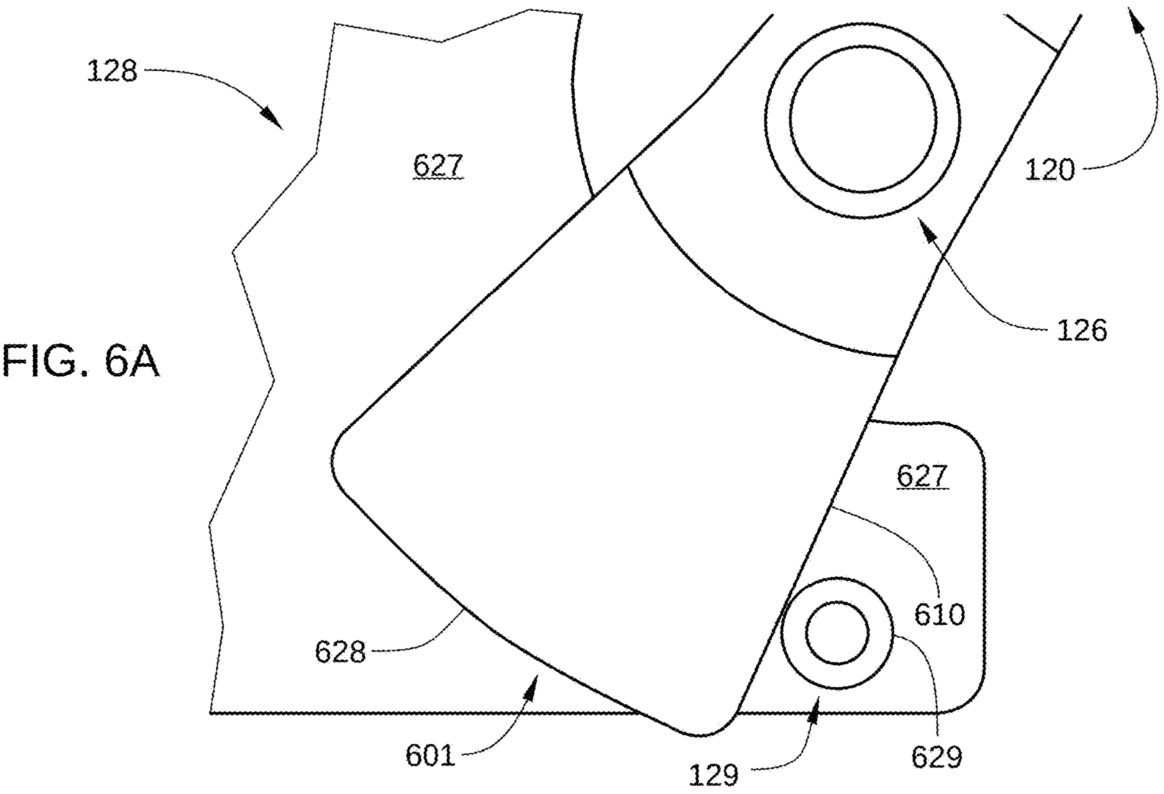
FIG. 6A schematically illustrates a voice coil housing of a VCM contacting a crash stop in a first position, according to various embodiments FIG. 6B schematically illustrates the voice coil housing of FIG. 6A contacting the crash stop in a second position, according to various embodiments.
Figure 6B:
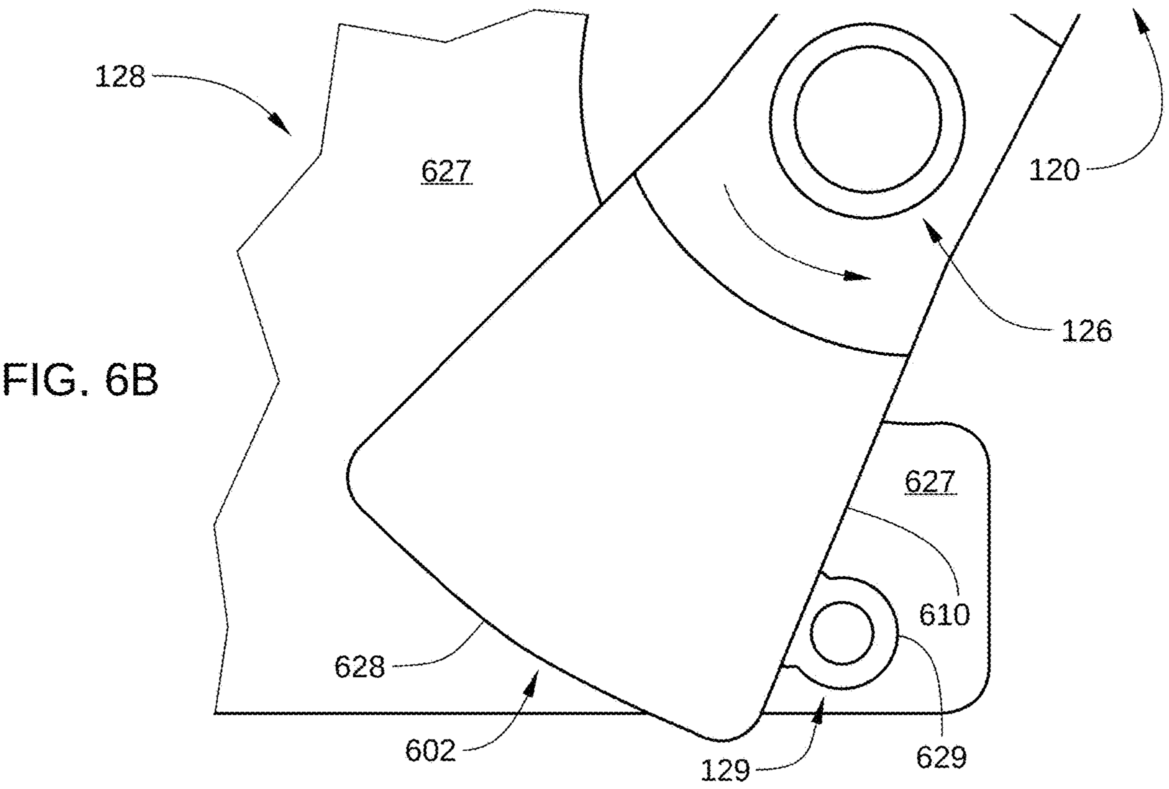

FIG. 6A schematically illustrates a voice coil housing 628 of VCM 128 contacting crash stop 129 in a first position, according to various embodiments, and FIG. 6B schematically illustrates voice coil housing 628 contacting crash stop 129 in a second position, according to various embodiments. Voice coil housing 628 encloses a voice coil (not shown) of VCM 128 and includes a surface 610 that can be moved in contact with crash stop 129. As shown, voice coil housing 628 of VCM 128 is coupled to actuator arm assembly 120 and rotates about bearing assembly 126, while a fixed magnet portion 627 of VCM 128 remains stationary.

Crash stop 129 is an inner diameter stopper that limits rotation of VCM 128 and actuator arm assembly 120 about bearing assembly 126 beyond a specified angle. Thus, crash stop 129 limits radial motion of read/write head 127 toward an ID of storage disk 110 (not shown). As shown, crash stop 129 includes an elastomeric surface 629. Elastomeric surface 629 can include any suitable polymer, natural rubber, foam, or other elastomeric material that enables crash stop 129 to operate as a cushioned bumper or stopper for motion of VCM 128 beyond the specified angle.

According to various embodiments, compression of elastomeric surface 629 of crash stop 129 with surface 610 of voice coil housing 628 causes elastomeric surface 629 to deflect and read/write head 127 to be radially positioned outside the user region 520 shown in FIG. 5. As a result, compression of elastomeric surface 629 with surface 610 causes read/write head 127 to be radially positioned within the inner diameter region 510 shown in FIG. 5. Further, because elastomeric surface 629 deflects in a repeatable fashion, using VCM 128 to compress elastomeric surface 629 with surface 610 can cause read/write head 127 to follow a predictable path within inner diameter region 510. For example, a radial position of read/write head 127 can be determined based on a VCM current that is applied to VCM 128 while compressing elastomeric surface 629. Therefore, within inner diameter region 510, read/write head 127 can be controlled to follow a predictable path based on the VCM current applied to VCM 128 while surface 610 is in contact with and compressing elastomeric surface 629.

In FIG. 6A, VCM 128 is in a first position 601, where surface 610 is in contact with elastomeric surface 629 and little or no VCM current is applied to VCM 128. Thus, little or no compression of elastomeric surface 629 occurs and read/write head 127 is positioned at or near user region border 512 (shown in FIG. 5). By contrast, in FIG. 6B, VCM 128 is in a second position 602, where surface 610 is in contact with elastomeric surface 629 and a specific VCM current is applied to VCM 128. Thus, a predictable amount of compression of elastomeric surface 629 occurs and read/write head 127 is positioned at a known radial location within inner diameter region 510.

Test Servo Pattern Written as Servo Spiral

In some embodiments, one or more test servo patterns are written as a servo spiral disposed within an inner diameter region of a recording surface, according to various embodiments. One embodiment of such test servo patterns is described below in conjunction with FIG. 7.

Figure 7:
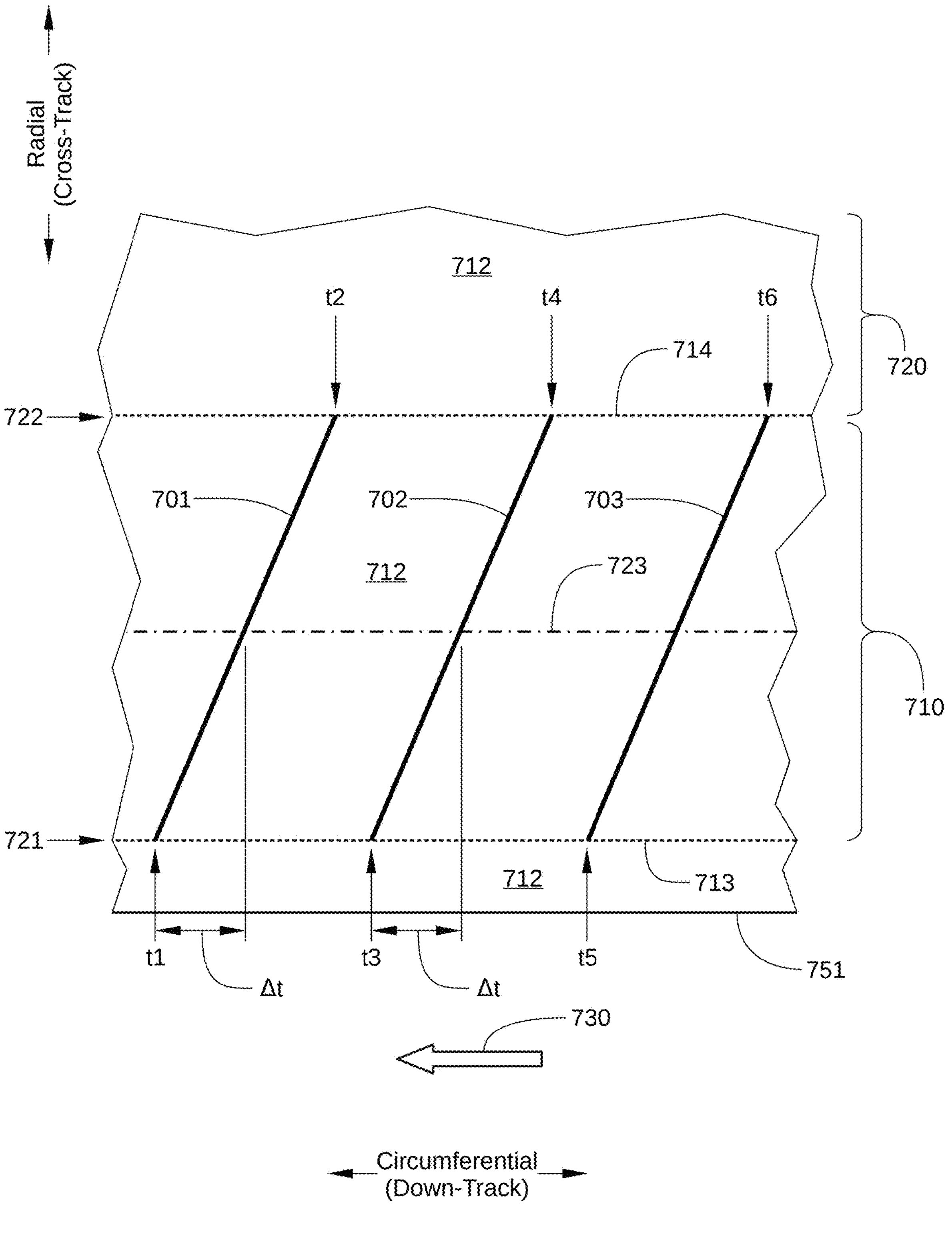
FIG. 7 schematically illustrates a portion of an inner diameter region of a recording surface, according to various embodiments.

FIG. 7 schematically illustrates a portion of an inner diameter region 710 of a recording surface 712, according to various embodiments. In some embodiments, inner diameter region 710 can be consistent with inner diameter region 510 in FIG. 5, and recording surface 712 can be consistent with recording surface 112 in FIG. 1. As shown, inner diameter region 710 is disposed between an ID 751 of recording surface 712 and a user region 720, and is bounded by an inner-diameter border 713 and a user region border 714. In the embodiment illustrated in FIG. 7, multiple test servo spirals 701-703 have been formed or written within inner diameter region 710 on recording surface 712 as shown.

Each of test servo spirals 701-703 extends across recording surface 712 in a radial (cross-track) direction and a circumferential (down-track) direction, and therefore appears as a diagonal line relative to the radial and circumferential directions. This is because each test servo spiral 701-703 is written by moving the read/write head associated with recording surface 712 from a first radial position 721 to a second radial position 722 while recording surface 712 rotates in a rotational direction 730. First radial position 721 corresponds to a radial position of the read/write head associated with recording surface 712 (e.g., read/write head 127 in FIG. 1) when an actuator of the read/write head (e.g., VCM 128 in FIG. 1) is moved into contact with crash stop 129 (shown in FIG. 1), then compresses elastomeric surface

629 (shown in FIG. 6) in response to a first VCM bias current $I_{VCM\ Bias\ 1}$ being applied to the actuator. Similarly, second radial position 722 corresponds to a radial position of the read/write head when the actuator of the read/write head is moved into contact with crash stop 129, then compresses elastomeric surface 629 in response to a second VCM bias current $I_{VCM\ Bias\ 2}$ being applied to the actuator. In the embodiment illustrated in FIG. 7, first VCM bias current $I_{VCM\ Bias\ 1}$ is greater than second VCM bias current $I_{VCM\ Bias\ 2}$, because greater compression of elastomeric surface 629 is needed to position the read/write head at first radial position 721, which is closer to ID 751 than second radial position 722.

Because recording surface 712 rotates at a constant rotational velocity, the circumferential location of the read/write head associated with recording surface 712 corresponds to a specific time that is known by the servo system of HDD 100, such as a spindle index value. Thus, each test servo spiral 701-703 can be written at a different circumferential location within inner diameter region 710 by starting the writing of each test servo spiral 701-703 at a different time relative to the spindle index. For example, in the embodiment illustrated in FIG. 7, the writing of test servo spiral 701 begins at time t1, the writing of test servo spiral 702 begins at time t3, and the writing of test servo spiral 703 begins at time t5.

To write test servo spiral 701 with a target slope, the read/write head is moved to first radial position 721 by applying first VCM bias current $i_{VCM\ Bias\ 1}$ to the actuator. Then, at time t1, the VCM bias current is changed at a constant rate from first VCM bias current $i_{VCM\ Bias\ 1}$ to second VCM bias current $i_{VCM\ Bias\ 2}$ while the write gate for the read/write head is activated. The rate of change of the VCM bias current is selected so that the read/write head reaches second radial position 722 at time t2. Thus, in some embodiments, the rate of change of VCM bias current ($\Delta i/\Delta t$) while writing test servo spiral 701 can be described with Equation 1:

$$\Delta i/\Delta t=[i_{VCM\,Bias\,2}-i_{VCM\,Bias\,2}]/\Delta t \qquad (1)$$

To write test servo spiral 702 with the same target slope as test servo spiral 701, the above process is repeated, where times t3 and t4 are selected so that t4–t3=t2–t1. Similarly, to write test servo spiral 703 with the same target slope as test servo spiral 701, the above process is repeated, where times t5 and t6 are selected so that t6–t5=t2–t1. It is noted that, because inner diameter region 710 is disposed within an ID crash-stop compression area, elastic compression of elastomeric surface 629 with the VCM for the read/write head enables repeatable positioning of the read/write head within inner diameter region 710. As a result, test servo spirals 701-703 can be written with relatively uniform slope, even though no servo information is present on recording surface 712 for controlling the position of the read/write head.

In the embodiment illustrated in FIG. 7, test servo spirals 701-703 are depicted as written from ID 751 toward user region 520 (from first radial position 721 to second radial position 722). Thus, in such embodiments, first VCM bias current $I_{VCM\ Bias\ 1}$ is greater than second VCM bias current $I_{VCM\ Bias\ 2}$, and VCM bias current decreases as each test servo spiral 701-703 is written. Alternatively, in some embodiments, test servo spirals 701-703 can be written from user region 520 toward ID 751 (from second radial position 722 to first radial position 721). Thus, in such embodiments, first VCM bias current $I_{VCM\ Bias\ 1}$ is less than second VCM bias current $I_{VCM\ Bias\ 2}$, and VCM bias current increases as each test servo spiral 701-703 is written.

In the embodiment illustrated in FIG. 7, test servo spirals 701-703 do not overlap circumferentially. For example, test servo spiral 702 does not circumferentially overlap test servo spiral 701 because time t3 occurs after time t2, and test servo spiral 703 does not circumferentially overlap test servo spiral 702 because time t5 occurs after time t4. However, because each test servo spiral 701-703 is written during a different revolution of recording surface 712, in some embodiments, test servo spirals 701-703 can be written to overlap circumferentially. For example, in such embodiments, time t3 may occur before time t2 and/or time t5 may occur before time t4.

In the embodiment illustrated in FIG. 7, three test servo spirals 701-703 are shown written in inner diameter region 710. In other embodiments, more than three or fewer than three test servo spirals can be written in inner diameter region 710. According to various embodiments, additional test servo spirals are written in inner diameter region 710 until a test servo spiral is determined to meet a quality threshold. Thus, in one instance, a small number of test servo spirals may be written by one read/write head, while in another instance a larger number of test servo spirals may be written by another read/write head before the quality threshold is met by the most recently written test servo spiral.

In some embodiments, each of test servo spirals 701-703 is measured at a particular radial position that is disposed between first radial position 721 and second radial position 722. In the embodiment illustrated in FIG. 7, each of test servo spirals 701-703 is measured at a read path 723. For example, read path 723 can be a radial position that is equidistant from first radial position 721 and second radial position 722. Alternatively, read path 723 can be located at a particular radial location between first radial position 721 and second radial position 722 that corresponds to more accurate measurement of test servo spirals 701-703. In either case, the read/write head associated with recording surface 712 is positioned at read path 723 by applying a third VCM bias current $I_{VCM\ Bias\ 3}$ to the actuator of the read/write head, where $I_{VCM\ Bias\ 1}>I_{VCM\ Bias\ 3}>I_{VCM\ Bias\ 2}$. In some embodiments, each of test servo spirals 701-703 is measured at a particular radial position and a particular timing window with respect to the launch time for that test servo spiral. For example, in such embodiments, test servo spiral 701 is measured at time t1+Δt and test servo spiral 702 is measured at time t3+Δt. In such embodiments, At can be determined using first test servo spiral 701, where a suitable value for At is selected that yields reasonable read-back information from first test servo spiral 701. At is then applied for examining the rest of test servo spirals 702-703.

In some embodiments, each test servo spiral 701-703 is configured similar to a conventional servo spiral, such as one of servo spirals 410 in FIG. 4. In such embodiments, each test servo spiral 701-703 includes timing and position information for the servo system of an HDD that can be employed during an SSW process, such as sync marks (not shown) that are separated circumferentially from adjacent sync marks by a constant timing interval.

Figure 8:
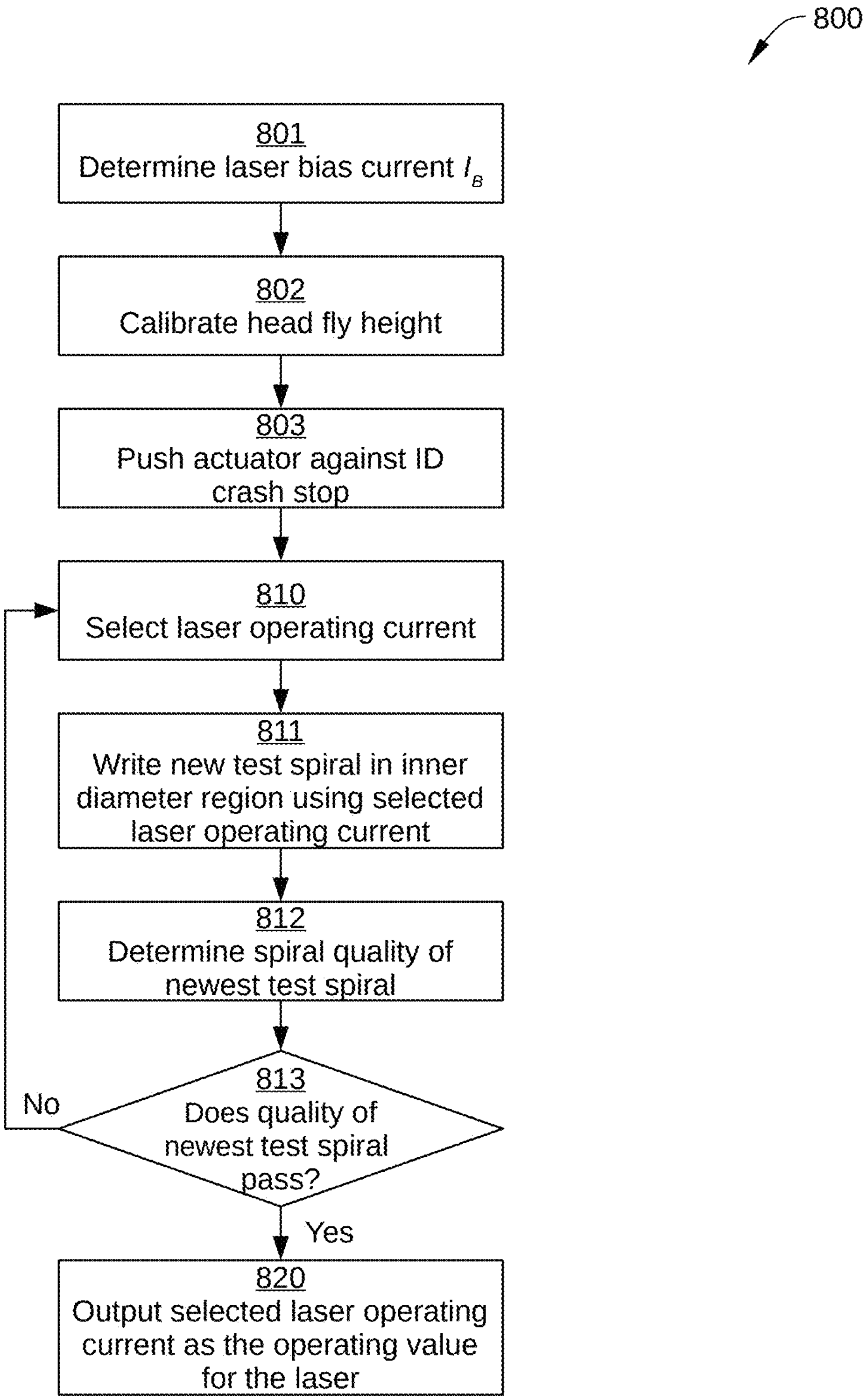
FIG. 8 sets forth a flowchart of method steps for a calibration process in a hard disk drive for a laser used to perform heat-assisted magnetic recording, according to various embodiments.

FIG. 8 sets forth a flowchart of method steps for a calibration process in an HDD for a laser used to perform HAMR, according to various embodiments. The method steps may include one or more operations, functions, or actions as illustrated by one or more of blocks 801-820. Although the blocks are illustrated in a sequential order, these blocks may be performed in parallel, and/or in a different order than those described herein. Also, the various blocks may be combined into fewer blocks, divided into additional blocks, and/or eliminated based upon a specific implementation. Although the method steps are described in conjunction with HDD 100 of FIGS. 1-7, persons skilled in the art will understand that the method steps may be performed with other types of systems. The control algorithms for the method steps may reside in microprocessor-based controller 133, some other controller associated with HDD 100, or a combination thereof. The control algorithms can be implemented in whole or in part as software- or firmware-implemented logic, and/or as hardware-implemented logic circuits.

A computer-implemented method 800 begins at step 801, where a suitable controller determines a laser bias current $I_B$ for the laser employed in read/write head 127, such as laser light source 224. Laser bias current $I_B$ indicates the current at which the diode of the laser begins lasing and is typically greater than zero. In some embodiments, laser bias current $I_B$ is determined via a thermal sensor within read/write head 127 that indicates that the diode is lasing. A depiction of laser bias current $I_B$ is described below in conjunction with FIG. 9.

Figure 9:
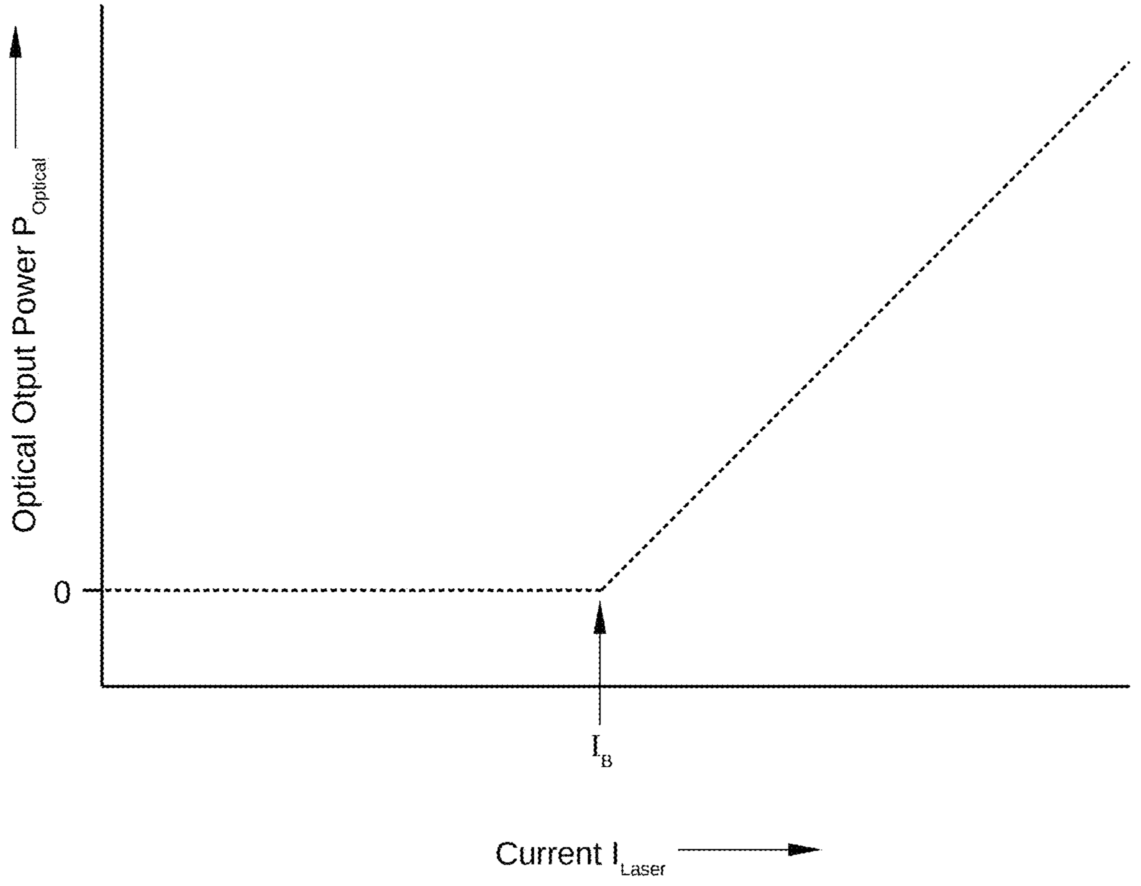
FIG. 9 is a plot depicting optical output power $P_{Optical}$ of a laser employed in a read/write head as a function of current $I_{Laser}$ applied to the laser, according to various embodiments.

FIG. 9 is a plot depicting optical output power $P_{Optical}$ of the laser employed in read/write head 127 as a function of current $I_{Laser}$ applied to the laser, according to various embodiments. Generally, current $I_{Laser}$ applied to a laser diode causes the laser diode to generate light, but the laser diode does not begin lasing until a threshold current, referred to herein as "laser bias current $I_B$," is reached. Because heat energy is transferred to a recording medium in the HAMR process via a laser spot, the laser in a HAMR read/write head does not transmit significant heat energy, referred to herein as "optical output power $P_{Optical}$," to a recording surface until the laser begins lasing. As shown in FIG. 9, optical output power $P_{Optical}$ increases above zero when current $I_{Laser}$ applied to the laser exceeds laser bias current $I_B$. In some embodiments, a thermal sensor within read/write head 127 detects heat generated by the laser when the value of current $I_{Laser}$ applied to the laser meets or exceeds laser bias current $I_B$. Generally, optical output power $P_{Optical}$ increases linearly from zero as a function of current $I_{Laser}$, once current $I_{Laser}$ applied to the laser exceeds laser bias current $I_B$. Thus, the operating current of the laser is at least greater than laser bias current $I_B$.

Returning to FIG. 8, in step 802, the controller calibrates a fly height of read/write head 127 above recording surface 112 of a storage disk 110. Various approaches are known in the art for the calibration of step 802. Typically, a setting for the dynamic fly-height heater included within slider 121 is determined in step 802, so that read/write head 127 maintains a target fly height (e.g., 2-3 nanometers). The calibration of step 802 compensates for the significant head-to-head variation in fly height that normally occurs without dynamic fly-height correction.

In step 803, the controller drives VCM 128 against crash stop 129. In HDD 100, crash stop 129, also referred to as a "head stack assembly (HSA) stopper," limits movement of VCM 128 so that read/write head 127 does not move too far toward the ID of storage disk 110 and contact the platter clamp. Generally, elastomeric surface 629 of crash stop 129 includes an elastomeric material, such as a hard rubber, that can be compressed a small amount by VCM 128.

In step 810, the controller selects a laser operating current, starting with a lowest suitable current for causing the laser to lase. Thus, in a first iteration of step 810 the controller selects a laser operating current that is at least equal to or greater than laser bias current $I_B$. In subsequent iterations of step 810, the controller selects a laser operating current that is an incrementally higher value than the previously selected value for laser bias current $I_B$.

In step 811, the controller causes a new test spiral (e.g., test servo spiral 701, 702, or 703) to be written in inner diameter region 710. In some embodiments, inner diameter region 710 is a target write region proximate ID 751 that corresponds to a radial band proximate ID 751 that is accessed (written to or read from) by read/write head 127 by pushing VCM 128 against crash stop 129 with sufficient force to compress elastomeric surface 629. Thus, in such embodiments, the test servo spiral is not disposed within user region 720 of recording surface 712. In step 811, the laser operating current selected in step 810 is used by the laser while writing the new test spiral.

In some embodiments, a new test spiral may be written in step 811 with varying slope by applying VCM current that changes in a non-linear manner while moving the actuator from first radial position 721 to second radial position 722. As a result, the width of the spiral crossing of the new test spiral can vary depending on the position of read path 723. In such embodiments, read path 723 can then be determined to facilitate a desired spiral crossing width.

In step 812, a quality of the new test spiral written in step 811 is determined, based on one or more quality metrics. Examples of such metrics include signal-to-noise ratio, spiral width, number of sync marks detected in the new test spiral, and the like. For example, in some embodiments, the controller causes the new test spiral to be read by read/write head 127, for example while read/write head 127 is located at measurement radial position 723, so that values for the one or more quality metrics can be quantified for the new test spiral.

In step 813, the controller determines whether the new test spiral meets a quality threshold, which can be based on a single quality metric and/or a combination of multiple quality metrics (e.g., signal-to-noise ratio, spiral width, and/or number of sync marks detected in the new test spiral). An acceptable signal-to-noise ratio for a plurality of test spirals is described below in conjunction with FIG. 10, while a spiral width and a number of sync marks associated with a test spiral are described below in conjunction with FIG. 11.

Figure 10:
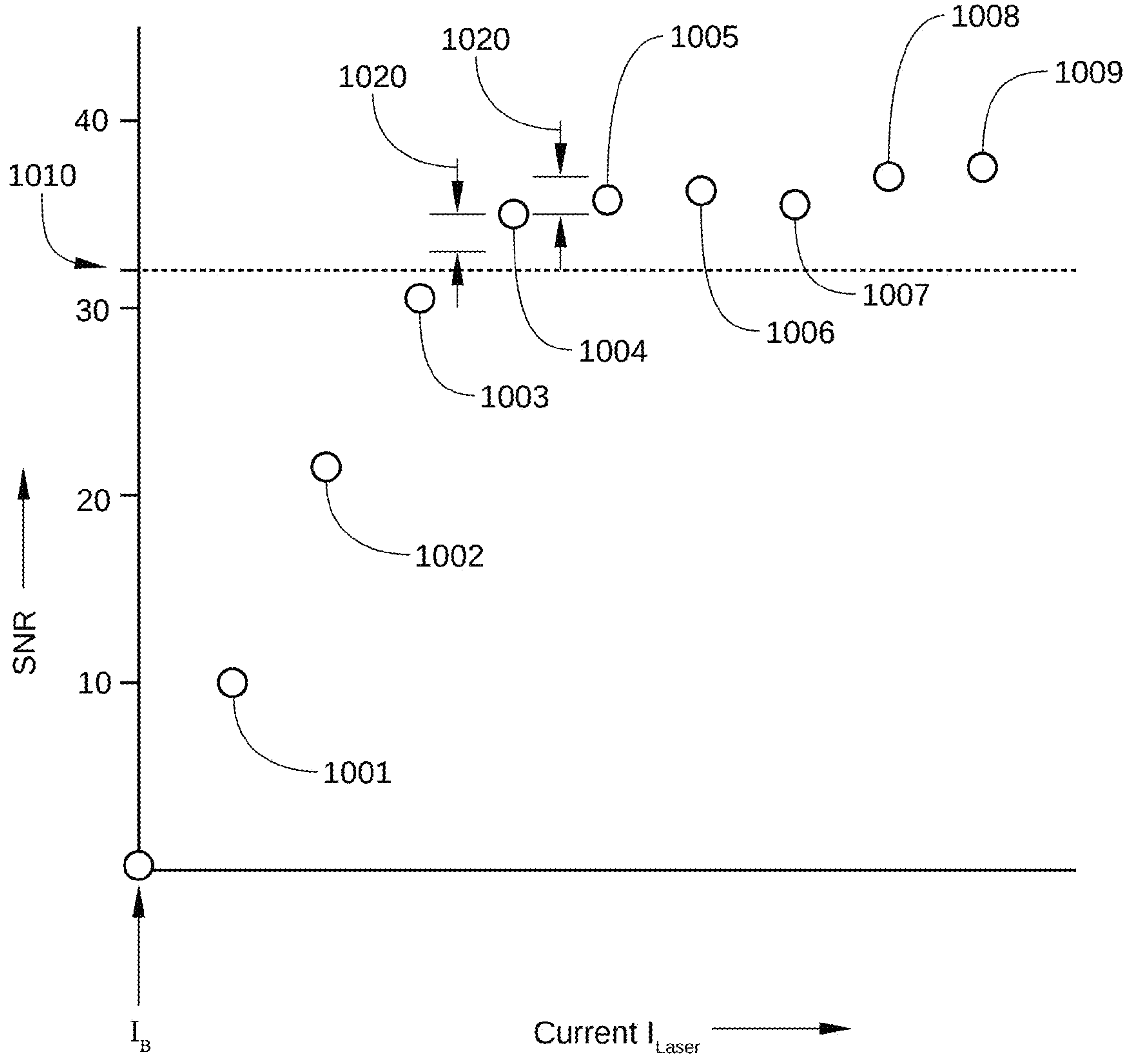
FIG. 10 is a plot depicting signal-to-noise ratio values measured for a plurality of test spirals, according to various embodiments.

FIG. 10 is a plot depicting signal-to-noise ratio (SNR) values 1001-1009 measured for a plurality of test spirals, according to various embodiments. In FIG. 10, each of SNR values 1001-1009 indicates measured SNR for a different test spiral, where each test spiral is written in a different iteration of step 811 with a different current $I_{Laser}$ applied to the laser. For example, in some embodiments, when read/write head 127 crosses a test spiral to be measured, a spiral search mode of read/write channel 137 is turned on to enable detection of the test spiral, and demodulation of the spiral crossing signal can be employed to calculate an SNR value for that test spiral. The spiral search mode of read/write channel 137 can be turned on for a particular test spiral based on a timing associated with the test spiral intersecting with a measurement radial position, such as read path 723 in FIG. 7.

As indicated by SNR values 1001-1004, SNR values initially increase with greater values of current $I_{Laser}$ applied to the laser when writing a test spiral. However, for test spirals that are written with higher values of current $I_{Laser}$, such as SNR values 1005-1009, the SNR values level off, and increases in current $I_{Laser}$ provide little or no increase in SNR.

In some embodiments, an acceptable SNR value for the test spiral measured in step 812 corresponds to a specific threshold SNR value 1010. Thus, in such embodiments, when the SNR value for the test spiral measured in step 812 exceeds threshold SNR value 1010, the new test spiral meets the quality threshold. For example, in the embodiment illustrated in FIG. 10, SNR value 1004 exceeds threshold SNR value 1010, and therefore the test spiral that corresponds to SNR value 1004 will be determined to have an acceptable SNR. Alternatively or additionally, in some embodiments, an acceptable SNR value for the test spiral measured in step 812 corresponds to an SNR value that increases by no more than an SNR improvement value 1020. For example, in the embodiment illustrated in FIG. 10, given an SNR improvement value 1020 of 2, SNR value 1005 increases from SNR value 1004 by less than SNR improvement value 1020, while SNR value 1004 increases from SNR value 1003 by more than SNR improvement value 1020. Therefore, the test spiral that corresponds to SNR value 1005 will be determined to have an acceptable SNR, while the test spiral that corresponds to SNR value 1004 will be determined to not have an acceptable SNR.

Figure 11:
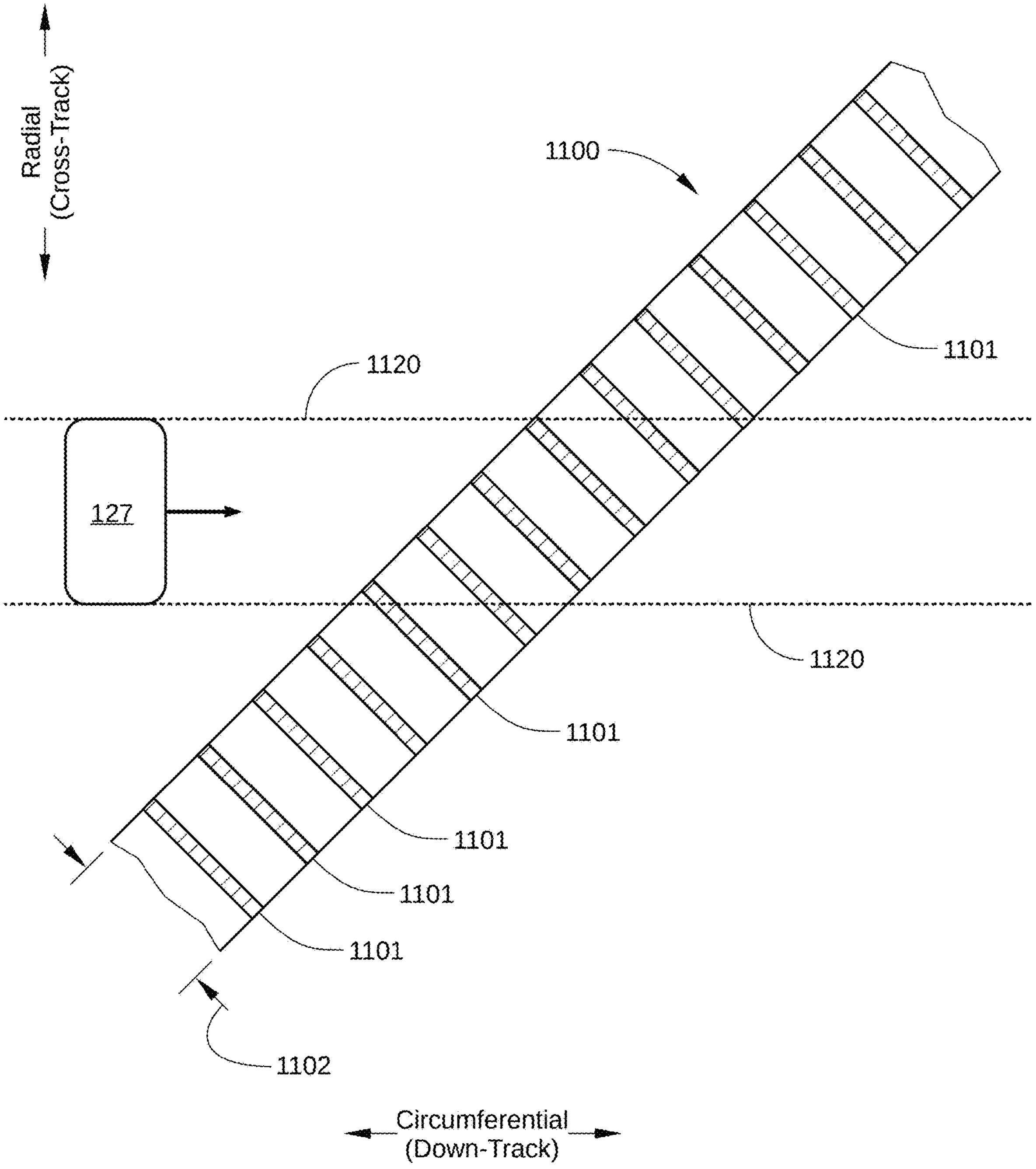
FIG. 11 schematically illustrates a test spiral written to an inner diameter region of a recording surface, according to various embodiments.

FIG. 11 schematically illustrates a test spiral 1100 written to an inner diameter region of a recording surface, according to various embodiments. Test spiral 1100 can be consistent with test servo spirals 701-703 in FIG. 7. As shown, test spiral 1100 extends across recording surface 712 in a radial (cross-track) direction and a circumferential (down-track) direction, and therefore appears as a diagonal line relative to the radial and circumferential directions.

In the embodiment illustrated in FIG. 11, test spiral 1100 includes a plurality of sync marks 1101 (cross-hatched) and has a spiral width 1102. When test spiral 1100 is written using a higher current $I_{Laser}$ applied to the laser, spiral width 1102 increases. Further, as spiral width 1102 increases, more sync marks are disposed within reading element path 1120. As a result, when test spiral 1100 is written using a higher current $I_{Laser}$ applied to the laser, read/write head 127 can detect a larger number sync marks 1101.

In some embodiments, an acceptable spiral width value for the test spiral measured in step 812 corresponds to a specific threshold spiral width value. Thus, in such embodiments, when spiral width 1102 for the test spiral measured in step 812 equals the threshold spiral width value, the new test spiral meets the quality threshold. Alternatively or additionally, in some embodiments, an acceptable number of sync marks for the test spiral measured in step 812 corresponds to a specific threshold number of sync marks that are detected when read/write head 127 crosses the new test spiral. Thus, in such embodiments, when the number of sync marks detected for the test spiral measured in step 812 equals the threshold number of sync marks, the new test spiral meets the quality threshold.

Returning to FIG. 8, in step 813, when the controller determines that the new test spiral meets a quality threshold or combination of quality thresholds, computer-implemented method 800 proceeds to step 820 and no further test spirals are written to inner diameter region 710. When the controller determines that the new test spiral fails to meet the quality threshold (or combination of quality thresholds), computer-implemented method 800 returns to step 810 and at least one more test spiral is written to inner diameter region 710.

In step 820, the controller outputs the selected laser operating current as the operating current for the laser. The operating current for the laser is then employed during a HAMR process to record one or more servo patterns on recording surface 712. For example, the operating current for the laser can be employed to write servo spirals consistent with servo spirals 410 and/or final product servo patterns consistent with servo sectors 350. Alternatively or additionally, the operating current for the laser can be employed to write user data to data storage tracks 360 in data sectors 365. As a result, head-to-head variation in laser performance in a HAMR hard disk drive can be compensated for without reducing the lifetime of the laser diode.

Test Servo Pattern Written as an Oscillatory Curve

In some embodiments, one or more test servo patterns are written as an oscillatory curve (e.g., a sinusoidal curve) that is disposed within an inner diameter region of a recording surface, according to various embodiments. One embodiment of such test servo patterns is described below in conjunction with FIG. 12.

Figure 12:
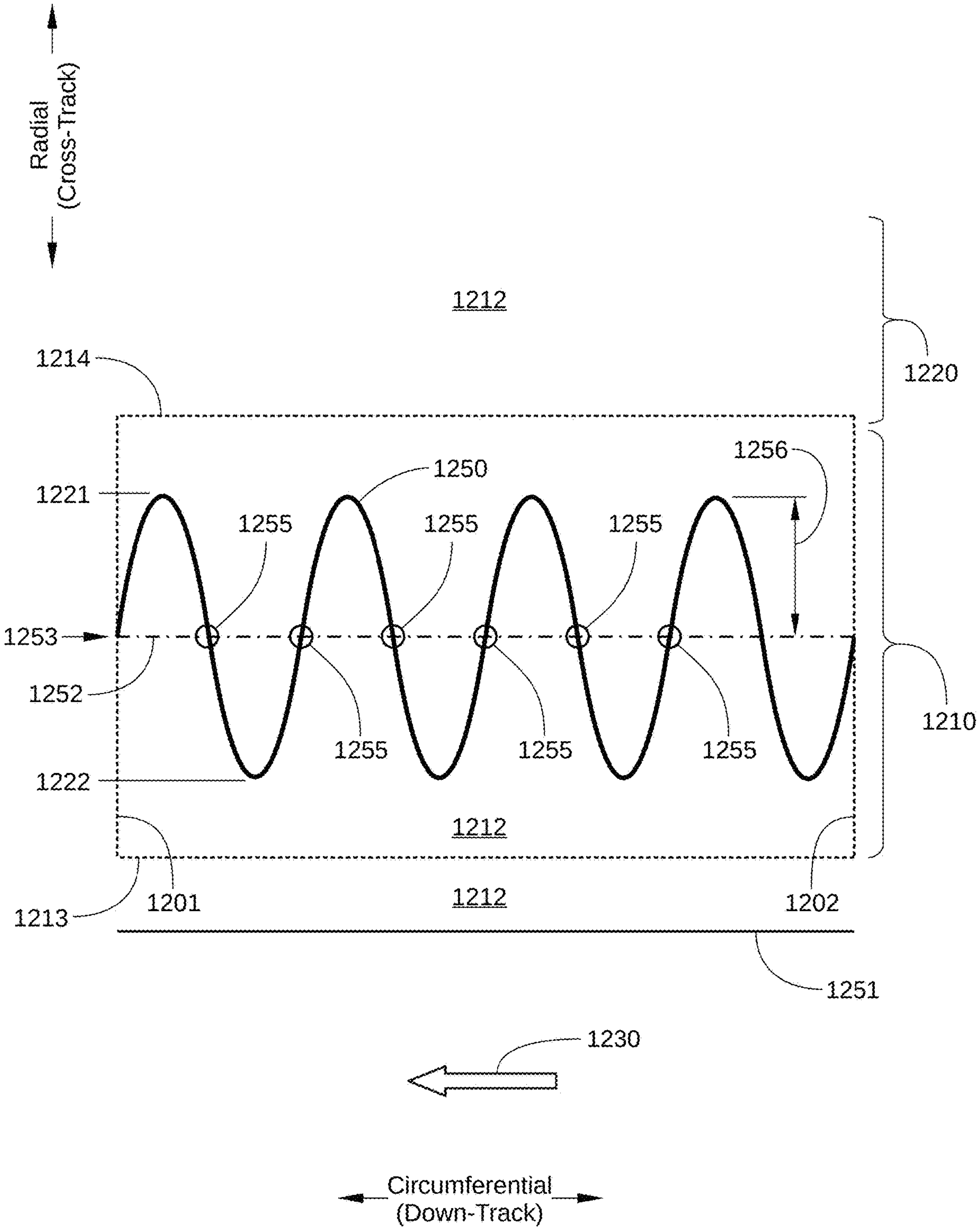
FIG. 12 schematically illustrates an inner diameter region of a recording surface, according to various embodiments.

FIG. 12 schematically illustrates an inner diameter region 1210 of a recording surface 1212, according to various embodiments. In some embodiments, inner diameter region 1210 can be consistent with inner diameter region 510 in FIG. 5, and recording surface 1212 can be consistent with recording surface 112 in FIG. 1. In practice, inner diameter region 1210 is an annular region disposed proximate an inner diameter 1251 of recording surface 1212. For clarity and ease of description, in FIG. 12, inner diameter region 1210 is depicted as a rectangular region that has a radial (cross-track) and circumferential (down-track) dimension. Because inner diameter region 1210 is actually an annular region, in the circumferential dimension, inner diameter region 1210 wraps around ID 1251 of recording surface 1212. Thus, a left-hand edge 1201 of inner diameter region 1210 coincides with a right-hand edge 1202 of inner diameter region 1210.

As shown, inner diameter region 1210 is disposed between ID 1251 of recording surface 1212 and a user region 1220, and is bounded in the radial direction by an inner-diameter border 1213 and a user region border 1214. In the embodiment illustrated in FIG. 12, a test servo pattern 1250 is written as a sinusoidal curve that is disposed within inner diameter region 1210 and is centered on a midline 1252. Alternatively, test servo pattern can be written as any other technically feasible periodically varying or oscillatory curve, such as a sawtooth curve, a series of parabolic curves, and the like.

In some embodiments, test servo pattern 1250 is written by moving the read/write head (not shown) associated with recording surface 1212 between a first radial position 1221 and a second radial position 1222 while recording surface 1212 rotates in a rotational direction 1230. To cause the read/write head to follow the sinusoidal path of test servo pattern 1250 shown in FIG. 12, a sinusoidally varying bias current is applied to the actuator for the read/write head. Before the sinusoidally varying bias current is applied to the actuator, the actuator is moved to a starting radial position 1253 of test servo pattern 1250. This is accomplished by first moving the actuator into contact with crash stop 129 (shown in FIG. 1), and then compressing elastomeric surface 629 (shown in FIG. 6) in response to a starting VCM bias current $I_{VCM\ Starting\ Bias}$ being applied to the actuator. In such embodiments, starting VCM bias current $I_{VCM\ Starting\ Bias}$ is selected to cause the actuator to compress elastomeric surface 629 so that the read/write head is positioned within inner diameter region 1210 at starting radial position 1253. In the embodiment illustrated in FIG. 12, starting radial position 1253 corresponds to midline 1252, but in other embodiments, starting radial position 1253 can be located at any other suitable radial position within inner diameter region 1210 for starting test servo pattern 1250.

When the read/write head associated with recording surface 1212 crosses test servo pattern 1250 proximate midline 1252, the signal transition seen by the read/write head is similar to the spiral crossings that occur in a typical spiral-based self-servo-write process. Consequently, the emulated spiral crossings of test servo pattern 1250 can provide a good representation of the signal quality of conventional servo spirals that are written on recording surface 1212 using the same laser current $I_{Laser}$ as that used for writing test servo pattern 1250. Further, because test servo pattern 1250 is a sinusoid, and therefore crosses a particular radial position multiple times per cycle, test servo pattern 1250 can be measured in multiple locations by the read/write head when the read/write head is held at a single radial position. For example, in embodiments in which test servo pattern 1250 is measured along midline 1252, signal quality of test servo pattern 1250 is measured at intersection points 1255. By contrast, test servo spirals 701-703 in FIG. 7 can only be measured a single time at a particular radial position.

As noted previously, to cause test servo pattern 1250 to follow an oscillatory path, a dynamically varying bias current is applied to the actuator for the read/write head, which in turn follows the dynamically varying path of a sinusoid. Simultaneously, the actuator dynamically compresses elastomeric surface 629, which acts as a spring. Consequently, the actuator and elastomeric surface 629 form a dynamic mechanical system with a spring constant and one or more resonant frequencies that are functions of the spring constant. Because the path followed by test servo pattern 1250 is essentially an output of a dynamic mechanical system, an amplitude 1256 of test servo pattern 1250 can be affected by one or more of the resonant frequencies of that dynamic mechanical system. This effect is described below in conjunction with FIG. 13.

Figure 13:
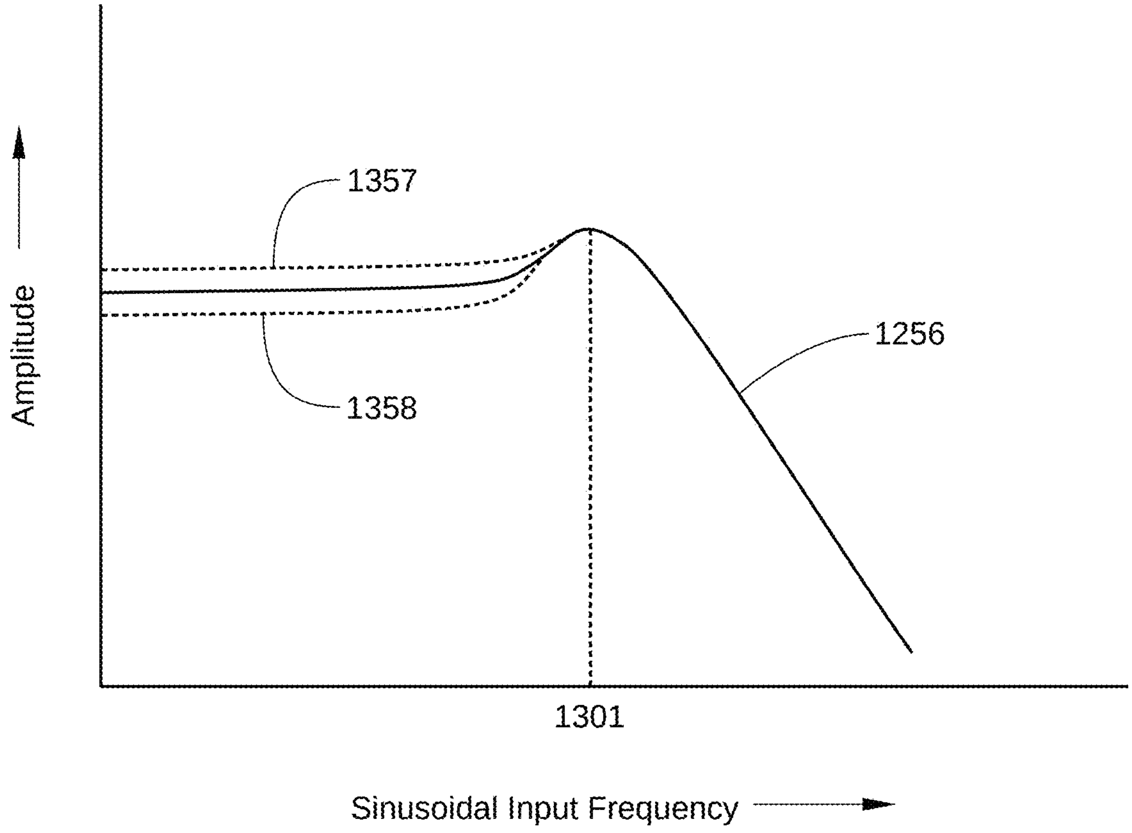
FIG. 13 is a plot depicting how an amplitude of a test servo pattern varies as a function of the frequency of a oscillating bias current applied to an actuator, according to various embodiments.

FIG. 13 is a plot depicting how an amplitude of a test servo pattern varies as a function of the frequency of a oscillatory or periodically varying bias current applied to an actuator, according to various embodiments. For reference, a resonant frequency 1301 of the dynamic mechanical system (e.g., VCM 128 and elastomeric surface 629) for generating test servo pattern 1250 is included in FIG. 13.

As shown, amplitude 1256 of test servo pattern 1250 (shown in FIG. 12) remains relatively constant while the injection frequency of the sinusoidally varying bias current applied to the actuator is less than resonant frequency 1301. This is because amplitude 1256 is primarily determined by the spring constant of the elastomeric surface 629, which is a constant value for a particular instance of elastomeric surface 629. As the injection frequency of the sinusoidally varying bias current exceeds resonant frequency 1301, amplitude 1256 trends downward linearly. This is because amplitude 1256 is primarily determined by the AC gain of the actuator once the natural resonance of the mechanical system cannot significantly contribute to amplitude 1256.

It is noted that there can be significant drive-to-drive variation in the value of the spring constant for elastomeric surface 629. The effect on amplitude 1256 of different values for the spring constant for elastomeric surface 629 is indicated in FIG. 13 by dashed lines 1357 and 1358. Such variations in amplitude 1256, which can be difficult to predict, can affect the slope of test servo pattern 1250, and thereby reduce the accuracy of quality measurements. To avoid the effect of unpredictable or imprecisely quantified spring constant values of elastomeric surface 629 on test servo pattern 1250, in some embodiments, a frequency of the sinusoidally varying bias current that is applied to VCM 128 is selected to be greater than a resonant frequency of the mechanical system that includes VCM 128 and elastomeric surface 629.

Figure 14:
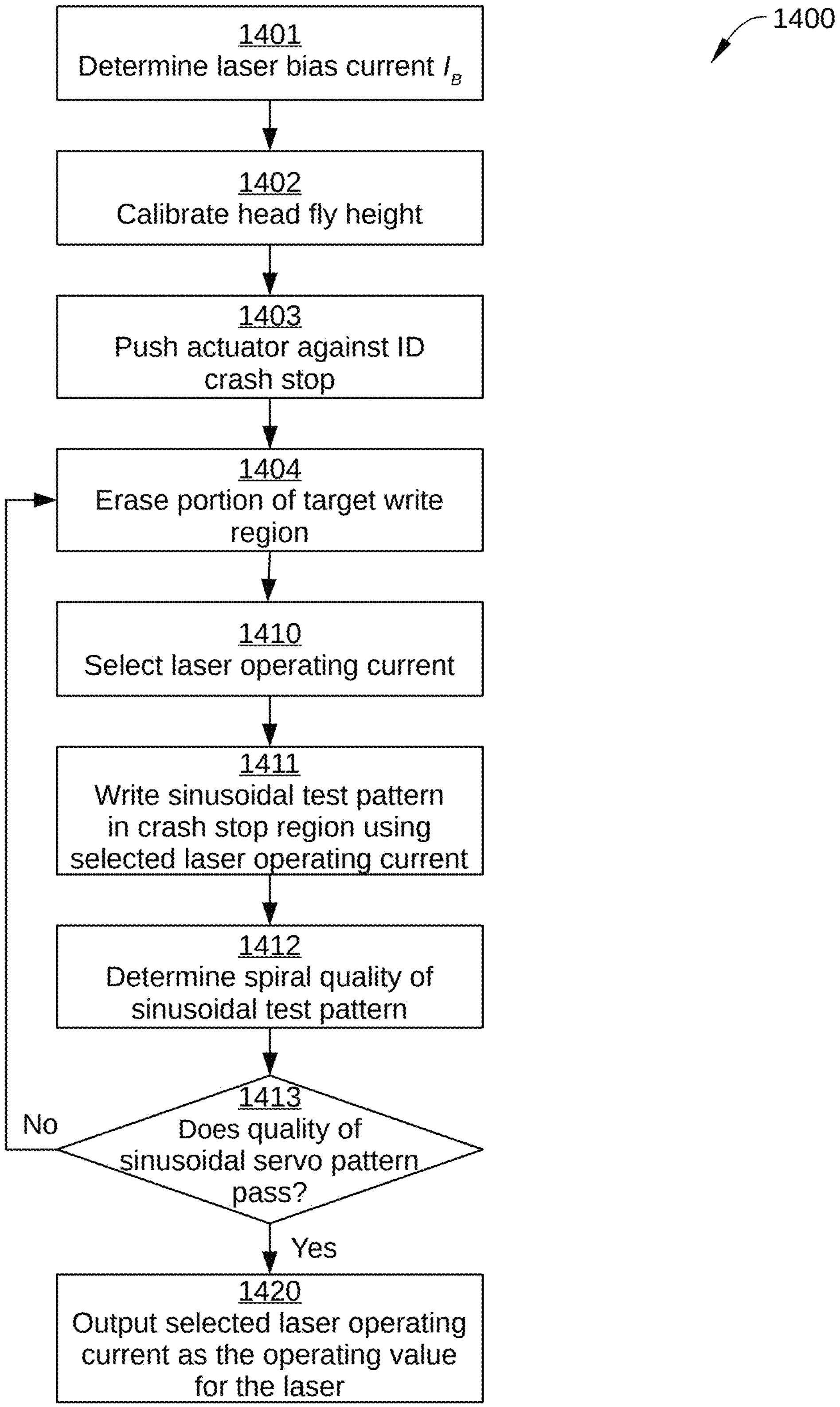
FIG. 14 sets forth a flowchart of method steps for a calibration process in a hard disk drive for a laser used to perform heat-assisted magnetic recording, according to various embodiments.

FIG. 14 sets forth a flowchart of method steps for a calibration process in an HDD for a laser used to perform HAMR, according to various embodiments. The method steps may include one or more operations, functions, or actions as illustrated by one or more of blocks 1401-1420. Although the blocks are illustrated in a sequential order, these blocks may be performed in parallel, and/or in a different order than those described herein. Also, the various blocks may be combined into fewer blocks, divided into additional blocks, and/or eliminated based upon a specific implementation. Although the method steps are described in conjunction with HDD 100 of FIGS. 1-7, persons skilled in the art will understand that the method steps may be performed with other types of systems. The control algorithms for the method steps may reside in microprocessor-based controller 133, some other controller associated with HDD 100, or a combination thereof. The control algorithms can be implemented in whole or in part as software- or firmware-implemented logic, and/or as hardware-implemented logic circuits.

A computer-implemented method 1400 begins at step 1401, where a suitable controller determines a laser bias current $I_B$ for the laser employed in read/write head 127. In some embodiments, step 1401 can be consistent with step 801 of computer-implemented method 800. In step 1402, the controller calibrates a fly height of read/write head 127 above recording surface 112 of a storage disk 110. In some embodiments, step 1402 can be consistent with step 802 of computer-implemented method 800. In step 1403, the controller drives VCM 128 against crash stop 129. In some embodiments, step 1403 can be consistent with step 803 of computer-implemented method 800.

In step 1404, the controller causes at least a portion of a target write region in the crash stop region to be erased by read/write head 127. By erasing the portion of the target write region, previously written test servo patterns and/or residual noise associated with the target write region are removed. Embodiments of the erased portion of the target write region are described below in conjunction with FIGS. 15 and 16.

Figure 15:
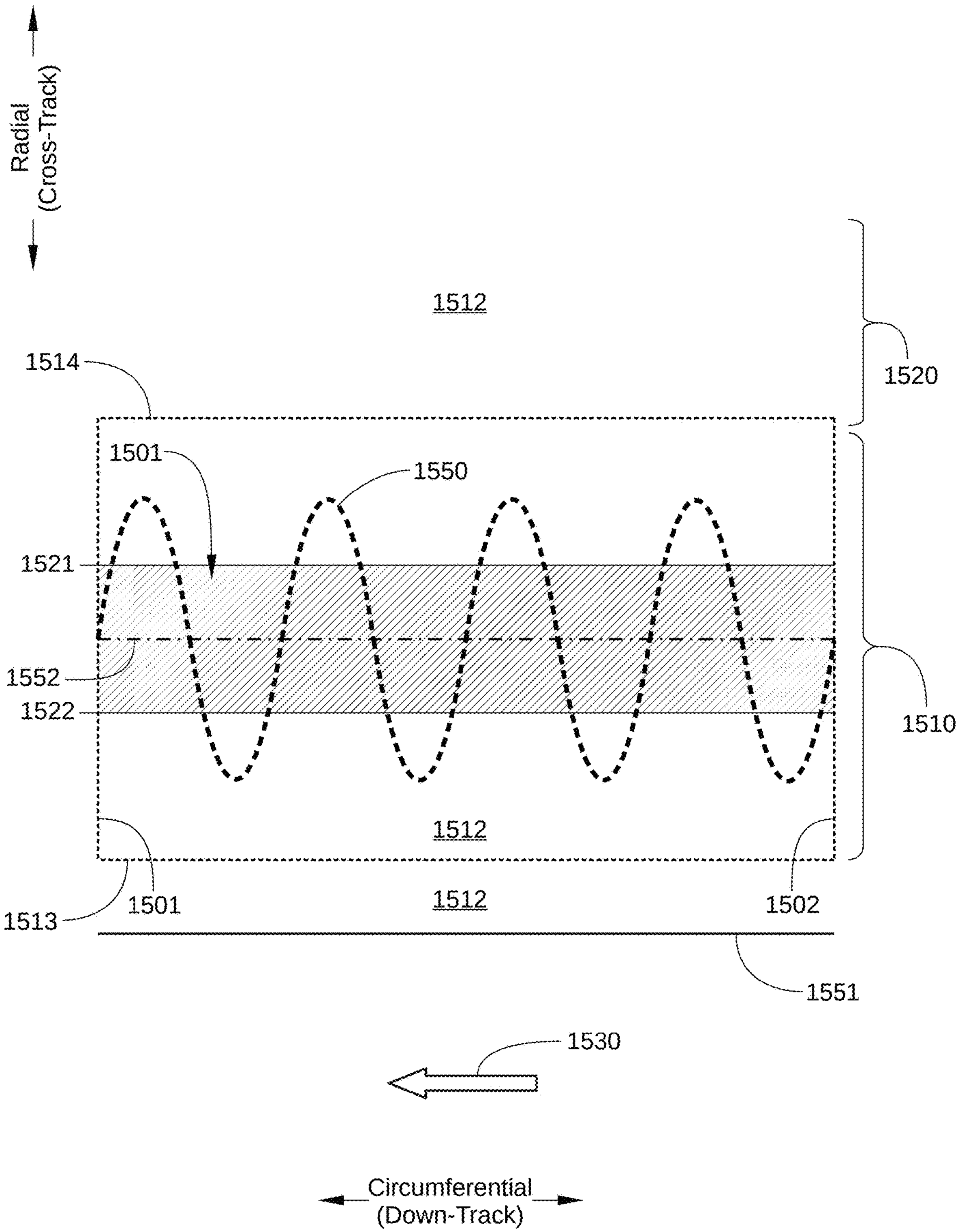
FIG. 15 schematically illustrates an inner diameter region of a recording surface, according to various embodiments.

FIG. 15 schematically illustrates an inner diameter region 1510 of a recording surface 1512, according to various embodiments. In some embodiments, inner diameter region 1510 can be consistent with inner diameter region 510 in FIG. 5, and recording surface 1512 can be consistent with recording surface 112 in FIG. 1. In practice, inner diameter region 1510 is an annular region disposed proximate an ID 1551 of recording surface 1512. For clarity and ease of description, in FIG. 15, inner diameter region 1510 is depicted as a rectangular region that has a radial (cross-track) and circumferential (down-track) dimension, and a left-hand edge 1501 of inner diameter region 1510 coincides with a right-hand edge 1502 of inner diameter region 110.

As shown, inner diameter region 1510 is disposed between ID 1551 of recording surface 1512 and a user region 1520, and is bounded in the radial direction by an inner-diameter border 1513 and a user region border 1514. For reference, a planned sinusoidal path 1550 (dashed lines) of a test servo pattern to be written in inner diameter region 510 is shown, as well as a midline 1552 of planned sinusoidal path 1550.

In the embodiment illustrated in FIG. 15, an erased portion 1501 (cross-hatched) of inner diameter region 1510 is erased, for example by moving the read/write head (not shown) associated with recording surface 1512 between a first radial position 1521 and a second radial position 1522 while recording surface 1512 rotates in a rotational direction 1530. Positioning the read/write head in the radial direction at first radial position 1521 can be accomplished by positioning a voice coil housing of the actuator of the read/write head into contact with elastomeric surface 629, then applying a starting VCM bias current $I_{VCM\ Bias\ Start}$ to the actuator. In such embodiments, starting VCM bias current $I_{VCM\ Bias\ Start}$ is selected so that elastomeric surface 629 is compressed to a sufficient degree that the read/write head is positioned at first radial position 1521. Motion of the read/write head in the radial direction from first radial position 1521 to second radial position 1522 can be accomplished by slowly and/or incrementally changing the bias current applied to the actuator from starting VCM bias current $I_{VCM\ Bias\ Start}$ to an ending VCM bias current $I_{VCM\ Bias\ End}$.

In some embodiments, erased portion 1501 of inner diameter region 1510 is a relatively narrow annular strip that spans a radial distance equivalent to no more than the radial distance spanned by a few hundred data storage tracks. By contrast, inner diameter region 510 can span a radial distance equivalent to the radial distance spanned by a few thousand data storage tracks.

In some embodiments, a default setting is employed for the current $I_{Laser}$ applied to the laser of the read/write head erasing erased portion 1501. Alternatively, in some embodiments, a low setting is initially employed for current $I_{Laser}$ applied to the laser of the read/write head, and a test portion of erased portion 1501 is erased. For example, a current value that is equal to or slightly higher than laser bias current $I_B$ can be a starting value for current $I_{Laser}$ in such a procedure. The value for current $I_{Laser}$ applied to the laser can then be gradually increased until residual noise is determined to be below a threshold value in the test portion, then the read/write head is used to erase all of erase portion 1501.

Figure 16:
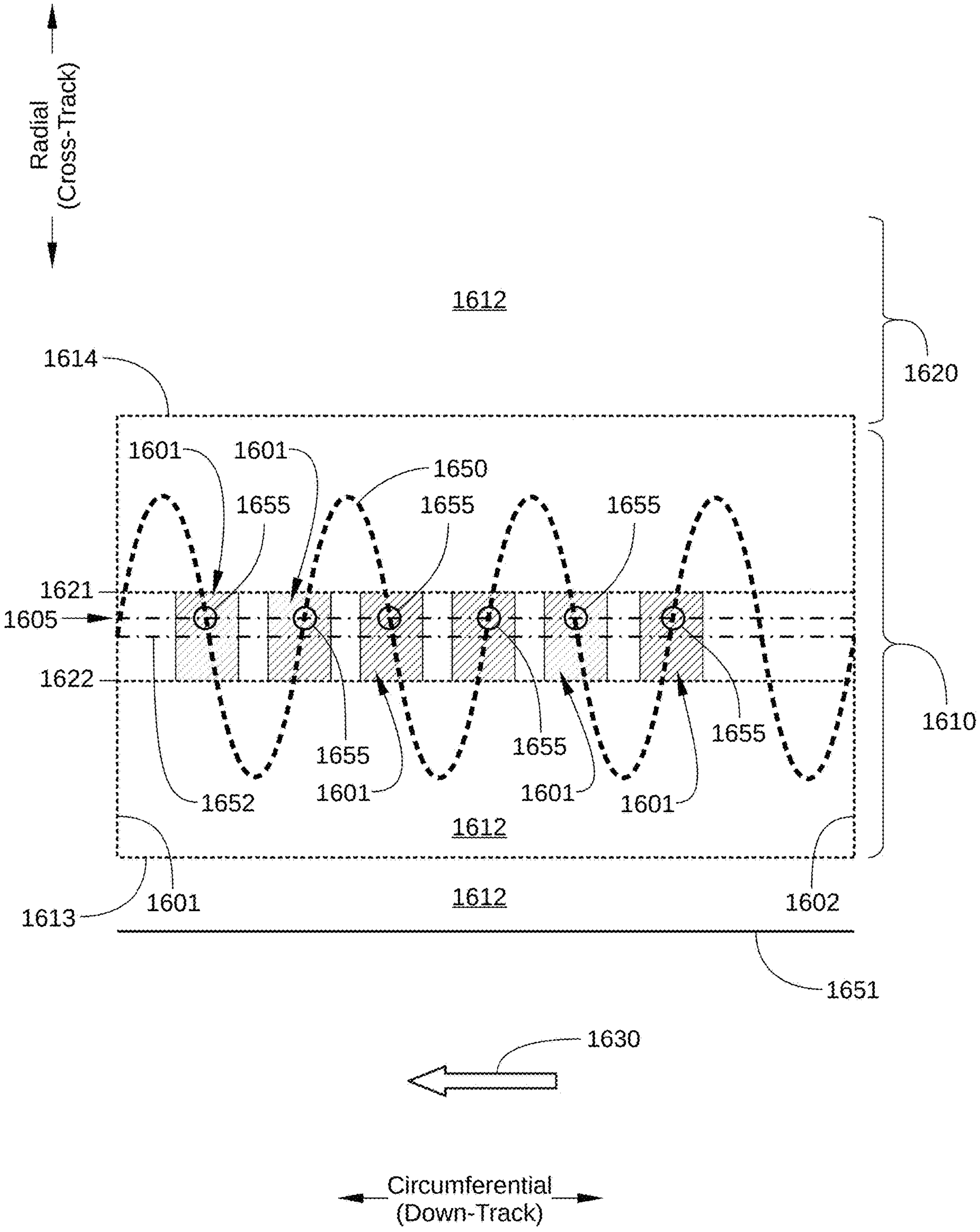
FIG. 16 schematically illustrates an inner diameter region of a recording surface, according to various embodiments.

FIG. 16 schematically illustrates an inner diameter region 1610 of a recording surface 1612, according to various embodiments. In some embodiments, inner diameter region 1610 can be consistent with inner diameter region 510 in FIG. 5, and recording surface 1612 can be consistent with recording surface 112 in FIG. 1. In practice, inner diameter region 1610 is an annular region disposed proximate an ID 1651 of recording surface 1612. For clarity and ease of description, in FIG. 16, inner diameter region 1610 is depicted as a rectangular region that has a radial (cross-track) and circumferential (down-track) dimension, and a left-hand edge 1601 of inner diameter region 1610 coincides with a right-hand edge 1602 of inner diameter region 1610.

As shown, inner diameter region 1610 is disposed between ID 1651 of recording surface 1612 and a user region 1620, and is bounded in the radial direction by an inner-diameter border 1613 and a user region border 1614. For reference, a planned sinusoidal path 1650 (dashed lines) of a test servo pattern to be written in inner diameter region 1610 is shown, as well as a midline 1652 of planned sinusoidal path 1650.

In the embodiment illustrated in FIG. 16, a plurality of erased portions 1601 (cross-hatched) of inner diameter region 1610 are erased. As shown, each erased portion 1601 corresponds to and includes an intersection point 1655 of a read path 1605 and planned sinusoidal path 1650, where read path 1605 is the radial position at which the read/write head (not shown) is located to measure the quality of a test servo pattern written on recording surface 1612. In some embodiments, read path 1605 is coincident with midline 1652 of planned sinusoidal path 1650. For clarity, in the embodiment illustrated in FIG. 16, read path 1605 is radially offset from midline 1652 of planned sinusoidal path 1650.

Similar to erased portion 1501 in FIG. 15, erased portions 1601 can be erased by moving the read/write head associated with recording surface 1612 between a first radial position 1621 and a second radial position 1622 while recording surface 1612 rotates in a rotational direction 1630. Unlike erased portion 1501, the plurality of erased portions 1601 are circumferentially separated from each other, as shown. In such embodiments, significantly less laser use is needed to erase previously written test servo patterns and/or residual noise proximate intersection points 1665.

Returning to FIG. 14, in step 1410, the controller selects a laser operating current, for example consistent with step 810 in computer-implemented method 800. In step 1411, the controller causes a test servo pattern to be written in inner diameter region 1510 or 1610 on a sinusoidal path by injecting sinusoidal current into VCM 128. In step 1411, the laser operating current selected in step 1410 is used by the laser to write the test servo pattern.

In some embodiments it may be desirable to use non-sinusoidal oscillatory test patterns. For example, in some embodiments, triangle-shaped or trapezoidal-shaped test patterns may be used to achieve a desired width of spiral crossings.

In some embodiments, the frequency of the injected sinusoidal signal (or other suitable periodic or oscillatory signal) is selected to be a harmonic of the spindle rotational frequency, and in a typical embodiment ranges from a hundred hertz to a few kilohertz. Alternatively or additionally, in some embodiments, the frequency of the injected sinusoidal signal is selected to be greater than a resonant frequency of the mechanical system that includes VCM 128 and elastomeric surface 629.

In step 1412, the controller determines the quality of the new test spiral written in step 1411. Step 1412 can be consistent with step 812 of computer-implemented method 800. In step 1413, the controller determines whether the new test spiral meets a quality threshold. Step 1413 can be consistent with step 813 of computer-implemented method 800. In step 1420, the controller outputs the selected laser operating current as the operating current for the laser. Step 1420 can be consistent with step 820 of computer-implemented method 800.

While the foregoing is directed to embodiments of the present invention, other and further embodiments of the invention may be devised without departing from the basic scope thereof, and the scope thereof is determined by the claims that follow.

We claim:

1. A disk drive, comprising:

a magnetic head that includes a laser;

a rotating magnetic recording medium associated with the magnetic head; and a controller configured to perform the steps of:

moving the magnetic head above a target write region at an inner diameter region of the rotating magnetic recording medium;

selecting a current value for the laser;

writing a test servo pattern on the target write region using the magnetic head while irradiating the target write region with the laser operating at the selected current value;

determining that the test servo pattern meets a quality threshold; and outputting the selected current value to be the current value to be used by the laser during heat-assisted magnetic recording of one or more servo patterns on the rotating magnetic recording medium, wherein determining that the test servo pattern meets the quality threshold comprises measuring at least one quality metric associated with the test servo pattern, and the at least one quality metric associated with the test servo pattern comprises one or more of a signal-to-noise ratio of the test servo pattern, a number of detectable sync marks associated with the test servo pattern, and a width of the test servo pattern.

2. The disk drive of claim 1, wherein the inner diameter region corresponds to a radial position of the magnetic head during compression of an elastomeric surface of a crash stop by a voice coil housing of a voice-coil motor of the disk drive.

3. The disk drive of claim 1, wherein the inner diameter region is disposed outside a user data region of the rotating magnetic recording medium.

4. The disk drive of claim 1, wherein the one or more servo patterns on the rotating magnetic recording medium comprise at least one of a servo spiral and a final product servo pattern.

5. The disk drive of claim 1, wherein the controller is configured to further perform the step of outputting the selected current value to be the current value to be used by the laser during heat-assisted magnetic recording of user data on the rotating magnetic recording medium.

6. The disk drive of claim 1, wherein the controller is configured to further perform the steps of:

prior to selecting the current value for the laser:

selecting an initial current value for the laser that is less than the selected current value;

writing an initial test servo pattern on the target write region using the magnetic head while irradiating the target write region with the laser operating at the initial current value; and determining that the initial test servo pattern does not meet the quality threshold.

7. The disk drive of claim 6, wherein the controller selects the current value for the laser in response to determining that the initial test servo pattern does not meet the quality threshold.

8. The disk drive of claim 6, wherein the initial test servo pattern is offset circumferentially from the test servo pattern.

9. The disk drive of claim 1, wherein the test servo pattern comprises a servo spiral.

10. A disk drive, comprising:

a magnetic head that includes a laser;

a rotating magnetic recording medium associated with the magnetic head; and a controller configured to perform the steps of:

moving the magnetic head above a target write region at an inner diameter region of the rotating magnetic recording medium;

selecting a current value for the laser;

writing a test servo pattern on the target write region using the magnetic head while irradiating the target write region with the laser operating at the selected current value;

determining that the test servo pattern meets a quality threshold; and outputting the selected current value to be the current value to be used by the laser during heat-assisted magnetic recording of one or more servo patterns on the rotating magnetic recording medium, wherein the test servo pattern comprises a servo spiral, and the servo spiral extends from an inner-diameter border of the target write region to a border of a user region of the rotating magnetic recording medium.

11. The disk drive of claim 1, wherein writing the test servo pattern on the target write region using the magnetic head comprises:

moving a voice coil housing of a voice-coil motor for the magnetic head against a crash stop of the disk drive;

while the voice coil housing is in contact with the crash stop, applying a first bias current to the voice coil motor; and changing the first bias current to a second bias current at a constant rate.

12. The disk drive of claim 11, wherein the first bias current corresponds to a first radial position of the magnetic head within the inner diameter region and the second bias current corresponds to a second radial position of the magnetic head within the inner diameter region.

13. The disk drive of claim 1, further comprising, prior to selecting the current value for the laser, determining a laser bias current of the laser.

14. The disk drive of claim 1, wherein the steps performed by the controller further comprise: prior to selecting the current value for the laser, determining a setting for a fly-height heater associated with the magnetic head.

15. A computer-implemented method of setting an operating current of a laser that is used in heat-assisted magnetic recording in a disk drive, said method comprising:

moving a magnetic head above a target write region at an inner diameter region of a rotating magnetic recording medium;

selecting a current value for the laser;

writing a test servo pattern on the target write region using the magnetic head while irradiating the target write region with the laser operating at the selected current value;

determining that the test servo pattern meets a quality threshold; and outputting the selected current value to be the current value to be used by the laser during heat-assisted magnetic recording of one or more servo patterns on the rotating magnetic recording medium, wherein the inner diameter region corresponds to a radial position of the magnetic head during compression of an elastomeric surface of a crash stop by a voice coil housing of a voice-coil motor of the disk drive.

16. The computer-implemented method of claim 15, further comprising, prior to selecting the current value for the laser, determining a laser bias current of the laser or determining a setting for a fly-height heater associated with the magnetic head.

17. The computer-implemented method of claim 15, wherein writing the test servo pattern on the target write region using the magnetic head comprises:

moving a voice coil housing of a voice-coil motor for the magnetic head against a crash stop of the disk drive;

while the voice coil housing is in contact with the crash stop, applying a first bias current to the voice coil motor; and changing the first bias current to a second bias current at a constant or non-linear rate.

18. The computer-implemented method of claim 15, further comprising:

setting the selected current value to be the current value to be used by the laser during heat-assisted magnetic recording of user data on a user data region of the rotating magnetic recording medium, wherein the inner diameter region is disposed outside the user data region of the rotating magnetic recording medium.

19. The disk drive of claim 10, wherein determining that the test servo pattern meets the quality threshold comprises measuring at least one quality metric associated with the test servo pattern, and the at least one quality metric associated with the test servo pattern comprises one or more of a signal-to-noise ratio of the test servo pattern, a number of detectable sync marks associated with the test servo pattern, and a width of the test servo pattern.

20. The disk drive of claim 10, wherein the steps performed by the controller further comprise: prior to selecting the current value for the laser, determining a laser bias current of the laser or determining a setting for a fly-height heater associated with the magnetic head.

* * * * *